(12) United States Patent
Xiong

(10) Patent No.: US 11,736,207 B2
(45) Date of Patent: Aug. 22, 2023

(54) CHANNEL CORRECTION METHOD AND APPARATUS

(71) Applicant: HUAWEI TECHNOLOGIES CO., LTD., Guangdong (CN)

(72) Inventor: Xin Xiong, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 215 days.

(21) Appl. No.: 17/465,537

(22) Filed: Sep. 2, 2021

(65) Prior Publication Data

US 2021/0399812 A1     Dec. 23, 2021

Related U.S. Application Data

(63) Continuation of application No. PCT/CN2020/080312, filed on Mar. 20, 2020.

(30) Foreign Application Priority Data

Mar. 22, 2019 (CN) .......................... 201910223772.4

(51) Int. Cl.
*H04B 17/14* (2015.01)
*H04B 17/21* (2015.01)
*H04B 17/318* (2015.01)

(52) U.S. Cl.
CPC ............. *H04B 17/14* (2015.01); *H04B 17/21* (2015.01); *H04B 17/318* (2015.01)

(58) Field of Classification Search
CPC ....... H04B 17/14; H04B 17/21; H04B 17/318
See application file for complete search history.

(56) References Cited

U.S. PATENT DOCUMENTS 9,961,688 B1   5/2018 Anvari
2006/0258298 A1* 11/2006 Kim .................. H04B 17/0085
                                                                        455/69

(Continued)

FOREIGN PATENT DOCUMENTS

CN         102035611 A      4/2011
CN         102891708 A      1/2013

(Continued)

OTHER PUBLICATIONS

Chen et al., "Distributed Massive MIMO: A Diversity Combining Method for TDD Reciprocity Calibration," GLOBECOM 2017—2017 IEEE Global Communications Conference, Jan. 15, 2018, 7 pages.

(Continued)

*Primary Examiner* — Duc C Ho
(74) *Attorney, Agent, or Firm* — Fish & Richardson P.C.

(57) ABSTRACT

The present disclosure discloses example channel correction methods and devices. One example method includes sending a correction reference signal to at least two antennas in a second remote radio unit (RRU) through at least two antennas in a first RRU by using a first transmit power and a first weight vector. Correction reference signals received by the second RRU are combined into a fifth correction reference signal. A correction reference signal sent by the at least two antennas in the second RRU are received by the first RRU through the at least two antennas in the first RRU. Correction reference signals received by the first RRU are combined into a sixth correction reference signal. A correction coefficient of the transmit and receive channels between the first RRU and the second RRU is calculated using the fifth correction reference signal and the sixth correction reference signal.

14 Claims, 10 Drawing Sheets

(56) References Cited

U.S. PATENT DOCUMENTS

2015/0200740 A1  7/2015  Yi et al.
2017/0077602 A1  3/2017  Li et al.
2018/0123666 A1  5/2018  Chen et al.

FOREIGN PATENT DOCUMENTS

| CN | 103229471 A | 7/2013 | |
|---|---|---|---|
| CN | 103716075 A | 4/2014 | |
| CN | 103905345 A | 7/2014 | |
| CN | 107171981 A | 9/2017 | |
| CN | 109861765 A | 6/2019 | |
| WO | WO-2011120455 A2 * | 10/2011 | ............. H04B 17/21 |
| WO | 2014198233 A1 | 12/2014 | |

OTHER PUBLICATIONS

Office Action issued in Chinese Application No. 201910223772.4 dated Mar. 5, 2021, 12 pages (with English translation).
PCT International Search Report and Written Opinion issued in International Application No. PCT/CN2020/080312 dated Jun. 19, 2020, 15 pages (with English translation).
Extended European Search Report issued in European Application No. 20776760.9 dated Mar. 22, 2022, 11 pages.

* cited by examiner

CHANNEL CORRECTION METHOD AND APPARATUS

CROSS-REFERENCE TO RELATED APPLICATIONS

This application is a continuation of International Application No. PCT/CN2020/080312, filed on Mar. 20, 2020, which claims priority to Chinese Patent Application No. 201910223772.4, filed on Mar. 22, 2019. The disclosures of the aforementioned applications are hereby incorporated by reference in their entireties.

TECHNICAL FIELD

This application relates to the communications field, and more specifically, to a channel correction method and apparatus.

BACKGROUND

With continuous development of communications technologies, to improve a data transmission rate, a coordinated multi-point transmission (CoMP) technology is introduced into a communications system. A prerequisite for using the CoMP technology in the communications system is that uplink channel state information (CSI) and downlink CSI meet reciprocity. CSI includes an air interface information part and a remote radio unit (RRU) information part. According to the physical characteristics of a channel, the air interface information part in the CSI meets the reciprocity requirement. Therefore, whether the RRU information part in the CSI meets the reciprocity requirement is mainly considered. Specifically, each RRU corresponds to an antenna array, and the number of transmit/receive channels in the RRU is consistent with the number of antennas in the antenna array. For example, if an antenna array of an RRU includes two antennas, two transmit/receive channels are correspondingly set in the RRU. Each transmit/receive channel includes a transmit channel and a receive channel. The RRU information part in the CSI may be divided into an intra-RRU channel information part and an inter-RRU channel information part. Because a response of an analog component in the channel has a temperature-varying characteristic and a time-varying characteristic, the RRU information part between antennas may not meet uplink and downlink reciprocity. The uplink and downlink reciprocity of the RRU information between antennas needs to be corrected online. The uplink and downlink reciprocity correction of the RRU information part between antennas includes: reciprocity correction of the intra-RRU channel information part and reciprocity correction of the inter-RRU channel information part.

First, to ensure the reciprocity of the intra-RRU channel information part, a channel response of a transmit/receive channel in the RRU needs to be corrected, so that a ratio of a channel response of a transmit channel to a channel response of a receive channel of each transmit/receive channel in the RRU is the same. Based on a coupled network manner, the channel information part in each RRU can complete channel correction, so that all antennas in each RRU meet reciprocity.

Further, to ensure that all antennas between RRUs meet reciprocity, a plurality of methods for correcting channel information parts between RRUs are proposed in an existing communications system. Hereinafter, the channel information part correction between RRUs is referred to as correction of transmit/receive channels between RRUs. After the correction of the transmit/receive channels between the RRUs is completed, all antennas in the communications system using the foregoing CoMP technology meet reciprocity.

However, in the existing methods for correcting transmit/receive channels between the RRUs, when a signal-to-noise ratio (SNR) of a correction reference signal received by the RRUs is too low or a power of a correction reference signal received by the RRUs is too high, correction of transmit/receive channels between the RRUs cannot be implemented. Therefore, how to avoid inability to correct transmit/receive channels between the RRUs due to an excessively low signal-to-noise ratio or an excessively high power of a correction reference signal received by the RRUs, and improve correction performance of the transmit/receive channels between the RRUs becomes a problem to be urgently resolved.

SUMMARY

This application provides a channel correction method and apparatus. A transmit-end RRU in every two of a plurality of RRUs sends correction reference signals to at least two antennas in a receive-end RRU through at least two antennas by using a power and a weight vector. Specifically, correction reference signals respectively received by the at least two antennas in the receive-end RRU are combined into one correction reference signal, and a correction coefficient for correcting transmit/receive channels between the two RRUs is calculated based on correction reference signals received and obtained through combination by the two RRUs (any RRU in every two RRUs may be a transmit-end RRU at one time, and may be a receive-end RRU at another time, and therefore there are two receive-end RRUs). In this way, a case in which the transmit/receive channels between the two RRUs cannot be corrected due to an excessively low signal-to-noise ratio or an excessively high power of the correction reference signal received by the receive-end RRU can be avoided, thereby improving correction performance of the transmit/receive channels between the RRUs.

According to a first aspect, a method for correcting transmit/receive channels between a first RRU and a second RRU is provided. The first RRU includes a first antenna and a second antenna, and the second RRU includes a third antenna and a fourth antenna. The method includes: the first RRU sends a first correction reference signal to the third antenna and the fourth antenna through the first antenna by using a first transmit power and a first weight vector; the first RRU sends a second correction reference signal to the third antenna and the fourth antenna through the second antenna by using the first transmit power and the first weight vector; the first RRU receives, through the first antenna and the second antenna, a third correction reference signal sent by the second RRU through the third antenna by using a second transmit power and a second weight vector; and the first RRU receives, through the first antenna and the second antenna, a fourth correction reference signal sent by the second RRU through the fourth antenna by using the second transmit power and the second weight vector. The first transmit power is a transmit power in a preset first transmit power set, the first weight vector is a weight vector in a preset first weight vector set, the second transmit power is a transmit power in a preset second transmit power set, and the second weight vector is a weight vector in a preset second weight vector set. A correction reference signal received by the third antenna and a correction reference signal received by the fourth antenna are combined into a fifth correction reference signal, and a correction reference signal received by the first antenna and a correction reference signal received by the second antenna are combined into a sixth correction reference signal. The fifth correction reference signal and the sixth correction reference signal are used to calculate a correction coefficient of the transmit/receive channels between the first RRU and the second RRU.

According to the channel correction method provided in this embodiment of this application, a transmit-end RRU in two RRUs selects an appropriate power and an appropriate weight vector from a transmit power set and a weight vector set that are known to the transmit-end RRU, and sends correction reference signals to at least two antennas in a receive-end RRU through at least two antennas in the transmit end RRU. Specifically, after the at least two antennas in the receive-end RRU receive the correction reference signals, one correction reference signal can be obtained through combination. Finally, a correction coefficient for correcting transmit/receive channels between the two RRUs is calculated based on the correction reference signal received by the receive-end RRU. In this embodiment of this application, the transmit-end RRU sends the correction reference signals through the at least two antennas by using a specific power and a specific weight. In this way, it can be ensured that when the receive-end RRU receives the correction reference signal, a case in which the transmit/receive channels between the two RRUs cannot be corrected due to an excessively low signal-to-noise ratio or an excessively high power of the received correction reference signal is avoided, thereby improving correction performance of the transmit/receive channels between the RRUs.

It should be understood that in this embodiment of this application, there is no limitation that one communications system includes only the first RRU and the second RRU. When the communications system includes a plurality of RRUs, the foregoing solution may be used for calculating a correction coefficient of channels between every two RRUs. Details are not described in this application.

It should be further understood that in this application, there is no limitation that each RRU includes only two antennas. In this application, each RRU may include a plurality of antennas. In the foregoing process of calculating the third correction reference signal and the fourth correction reference signal, at least two antennas may be selected from a plurality of antennas in the transmit-end RRU to send the correction reference signal.

It should be further understood that an execution body for calculating the correction coefficient of the transmit/receive channels between the first RRU and the second RRU based on the third correction reference signal and the fourth correction reference signal is not limited in this application. For example, the first RRU may calculate the correction coefficient, and in this case, the second RRU may notify the first RRU of a calculated value of the fourth correction reference signal. Alternatively, the second RRU may calculate the correction coefficient, and in this case, the first RRU may notify the second RRU of a calculated value of the fourth correction reference signal. Alternatively, a BBU connected to the first RRU may calculate the correction coefficient, and in this case, the second RRU may notify the first RRU of a calculated value of the fourth correction reference signal, and when the first RRU obtains values of the third correction reference signal and the fourth correction reference signal, it is equivalent to that the BBU connected to the first RRU obtains the values of the third correction reference signal and the fourth correction reference signal. Alternatively, a BBU connected to the second RRU may calculate the correction coefficient, and in this case, the first RRU may notify the second RRU of a calculated value of the fourth correction reference signal, and when the second RRU obtains values of the third correction reference signal and the fourth correction reference signal, it is equivalent to that the BBU connected to the second RRU obtains the values of the third correction reference signal and the fourth correction reference signal. Alternatively, another management device in a system to which the first RRU and the second RRU belong may calculate the correction coefficient, and in this case, the second RRU may notify the management device of a calculated value of the fourth correction reference, and the first RRU may notify the management device of a calculated value of the third correction reference signal value.

Specifically, the preset first transmit power set and the preset first weight vector set are sets known to the first RRU, and the preset second transmit power set and the preset second weight vector set are sets known to the second RRU. The preset set may be understood as a set preconfigured by a developer. A value and a quantity of parameters included in the preset set (it may be understood that a set should include at least two parameters) are not limited in this application. The preset set may be configured by the developer based on a prior result, or may be empirically configured by the developer.

Specifically, how to determine the first transmit power, the first weight vector, the second transmit power, and the second weight vector is not limited in the foregoing procedure. This is because appropriate values may be empirically selected from the preset first transmit power set, the preset first weight vector set, the preset second transmit power set, and the preset second weight vector set, or may be selected through calculation. How to select the first transmit power, the first weight vector, the second transmit power, and the second weight vector through calculation is described below. Details are not described herein.

With reference to the first aspect, in some implementations of the first aspect, the fifth correction reference signal may be obtained in the following manner: the fifth correction reference signal is obtained by adding a correction reference signal obtained after the correction reference signal received by the third antenna is multiplied by a weight corresponding to the third antenna in the second weight vector and a correction reference signal obtained after the correction reference signal received by the fourth antenna is multiplied by a weight corresponding to the fourth antenna in the second weight vector.

With reference to the first aspect, in some implementations of the first aspect, the sixth correction reference signal may be obtained in the following manner: the sixth correction reference signal is obtained by adding a correction reference signal obtained after the correction reference signal received by the first antenna is multiplied by a weight corresponding to the first antenna in the first weight vector and a correction reference signal obtained after the correction reference signal received by the second antenna is multiplied by a weight corresponding to the second antenna in the first weight vector.

According to the channel correction method provided in this embodiment of this application, after the at least two antennas in the receive-end RRU (the first RRU may serve as the receive-end RRU, or the second RRU may serve as the receive-end RRU) receive the correction reference signals, the receive-end RRU may combine the correction reference signals based on a weight vector used by the receive-end RRU, as a transmit-end RRU, to send the correction reference signals, to obtain one correction reference signal. In this way, how to combine correction reference signals received by a plurality of antennas can be clarified, thereby improving combination accuracy.

With reference to the first aspect, in some implementations of the first aspect, the first correction reference signal is a correction reference signal obtained after a preset correction reference signal is multiplied by the weight corresponding to the first antenna in the first weight vector, and the second correction reference signal is a correction reference signal obtained after the preset correction reference signal is multiplied by the weight corresponding to the second antenna in the first weight vector.

According to the channel correction method provided in this embodiment of this application, the transmit-end RRU sends the correction reference signals through the at least two antennas based on weights that correspond to the antennas and that are included in a determined weight vector. In this way, a signal-to-noise ratio of the correction reference signal received by the receive-end RRU can be adjusted on the basis of changing the weight vector.

With reference to the first aspect, in some implementations of the first aspect, an optional set includes at least one optional subset, the optional subset includes a transmit power and a weight vector that can be used by the first RRU, as a transmit end, to send the correction reference signal through the antenna and a transmit power and a weight vector that can be used by the second RRU, as a transmit end, to send the correction reference signal through the antenna, and a first optional subset in the at least one optional subset includes the first transmit power, the first weight vector, the second transmit power, and the second weight vector.

According to the channel correction method provided in this embodiment of this application, the transmit power and the weight vector that are to be used by the transmit-end RRU to send the correction reference signal are included in the first optional subset. In other words, when the optional subset is determined, the transmit power and the weight vector that are to be used by the transmit-end RRU to send the correction reference signal can be determined, thereby improving calculation accuracy of the correction coefficient. In addition, the first optional subset is selected from the at least one optional subset, and the plurality of optional subsets include the transmit power and the weight vector that can be used by the transmit-end RRU to send the correction reference signal. That is, when there are a plurality of optional subsets, the first optional subset needs to be determined, and the transmit-end RRU sends the correction reference signal to the receive-end RRU through the antenna in the transmit-end RRU by using the transmit power and the weight vector included in the first optional subset.

In other words, in this embodiment of this application, there may be a plurality of transmit powers and weight vectors that can be used by the RRU to send the correction reference signal, which increases flexibility of the solution.

With reference to the first aspect, in some implementations of the first aspect, the first optional subset corresponds to a first receive power, a second receive power, a third receive power, a fourth receive power, a signal-to-noise ratio of the fifth correction reference signal, and a signal-to-noise ratio of the sixth correction reference signal. The first receive power, the second receive power, the third receive power, and the fourth receive power meet a preset power threshold, and the signal-to-noise ratio of the fifth correction reference signal and the signal-to-noise ratio of the sixth correction reference signal meet a preset signal-to-noise ratio threshold. The first receive power is a power of the correction reference signal received by the first antenna, the second receive power is a power of the correction reference signal received by the second antenna, the third receive power is a power of the correction reference signal received by the third antenna, and the fourth receive power is a power of the correction reference signal received by the fourth antenna.

According to the channel correction method provided in this embodiment of this application, the optional subset needs to meet a specific preset condition, that is, a receive power and a signal-to-noise ratio of the correction reference signal received by the receive-end RRU need to be taken into account in a process of determining the optional subset. That is, when the transmit-end RRU sends the correction reference signal by using the transmit power and the weight vector included in the optional subset that meets the condition, it can be ensured that the receive power and the signal-to-noise ratio of the correction reference signal received by the receive-end RRU meet a requirement. Therefore, a case in which the transmit/receive channels between the RRUs cannot be corrected due to an excessively low signal-to-noise ratio or an excessively high power of the correction reference signal received by the receive-end RRU can be avoided.

Specifically, in this embodiment of this application, to determine the optional subset that meets the requirement, a transmit power in the first transmit power set, a weight vector in the first weight vector set, a transmit power in the second transmit power set, and a weight vector in the second weight vector set may be traversed to determine an optional subset that includes a third transmit power, a third weight vector, a fourth transmit power, and a fourth weight vector that meet the requirement. The third transmit power, the third weight vector, the fourth transmit power, and the fourth weight vector may correspond to the first transmit power, the first weight vector, the second transmit power, and the second weight vector, or may correspond to another transmit power in the first transmit power set, another weight vector in the first weight vector set, another transmit power in the second transmit power set, and another weight vector in the second weight vector set. In other words, there may be a plurality of optional subsets that meet the requirement. A traversal process may be: determining whether a receive power and a signal-to-noise ratio that are of the correction reference signal received by the receive end and that correspond to an optional subset that includes any transmit power in the first transmit power set, any weight vector in the first weight vector set, any transmit power in the second transmit power set, and any weight vector in the second weight vector set meet the requirement.

With reference to the first aspect, in some implementations of the first aspect, the method further includes: the first RRU calculates the signal-to-noise ratio of the sixth correction reference signal, or the first RRU calculates a signal-to-noise ratio of a correction reference signal obtained after the correction reference signal received by the first antenna and the correction reference signal received by the second antenna are combined based on each weight vector in the first weight vector set. That a correction reference signal is obtained through combination based on a weight vector means that the correction reference signal received by the first antenna and the correction reference signal received by the second antenna are respectively multiplied by the weights corresponding to the first antenna and the second antenna in the weight vector, and multiplication results are added.

According to the channel correction method provided in this embodiment of this application, after receiving the correction reference signal sent by the transmit-end RRU, the receive-end RRU needs to combine a correction reference signal received by at least one antenna into one correction reference signal, and calculates a signal-to-noise ratio of the combined correction reference signal. Specifically, when calculating the signal-to-noise ratio of the combined correction reference signal, the receive-end RRU may calculate a signal-to-noise ratio only of a correction reference signal obtained through combination based on a weight vector used by the current receive-end RRU, as a transmit-end RRU, to send the correction reference signal. Alternatively, for the correction reference signals received by the at least two antennas in the receive-end RRU, the receive-end RRU may calculate each combined correction reference signal based on each weight vector in a weight vector set of the receive-end RRU, and calculate a signal-to-noise ratio of each combined correction reference signal.

That is, after the at least two antennas in the receive-end RRU receive the correction reference signals, when calculating the combined correction reference signal, the receive-end RRU may traverse each weight vector in the weight vector set of the receive-end RRU to calculate each combined correction reference signal, and calculate the signal-to-noise ratio of the correction reference signal obtained through combination based on each weight vector. A plurality of calculated signal-to-noise ratios may be locally cached, and a specific signal-to-noise ratio may be locally obtained when the specific signal-to-noise ratio needs to be used.

With reference to the first aspect, in some implementations of the first aspect, a signal-to-noise ratio with a smaller value in the signal-to-noise ratio of the fifth correction reference signal and the signal-to-noise ratio of the sixth correction reference signal is a signal-to-noise ratio with a largest value in a plurality of signal-to-noise ratios. Each of the plurality of signal-to-noise ratios is a signal-to-noise ratio with a smaller value in two signal-to-noise ratios corresponding to each of a plurality of optional subsets. The two signal-to-noise ratios corresponding to each of the plurality of optional subsets are signal-to-noise ratios of correction reference signals obtained after correction reference signals received by antennas in each of two RRUs are combined.

For example, an optional subset includes a transmit power #1, a weight vector #1, a transmit power #2, and a weight vector #2. When the transmit end sends a correction reference signal to the receive end by using the transmit power #1 and the weight vector #1, a signal-to-noise ratio of a correction reference signal obtained after correction reference signals received by antennas in the receive end are combined based on the weight vector #2 is one of two signal-to-noise ratios corresponding to the optional subset, and when the transmit end sends a correction reference signal to the receive end by using the transmit power #2 and the weight vector #2, a signal-to-noise ratio of a correction reference signal obtained after correction reference signals received by the antennas in the receive end are combined based on the weight vector #1 is the other signal-to-noise ratio in the two signal-to-noise ratios corresponding to the optional subset.

According to the channel correction method provided in this embodiment of this application, an optimal subset (the first optional subset) may be selected from the plurality of determined optional subsets. The optimal optional subset includes the first transmit power, the first weight vector, the second transmit power, and the second weight vector, to improve correction performance.

It should be understood that in this application, there is no limitation that the optimal optional subset needs to be selected. Any optional subset may be selected from the plurality of optional subsets that meet the requirement.

It should be understood that "first" and "second" in this application are merely used for distinguishing between descriptions, and shall constitute no limitation on this application. The first RRU and the second RRU are merely used for distinguishing between different RRUs. Specifically, when the first RRU is a transmit-end RRU, the second RRU is a receive-end RRU. When the second RRU is a transmit-end RRU, the first RRU is a receive-end RRU.

According to a second aspect, a first RRU is provided. The first RRU may be configured to perform the operation of the first RRU in any one of the first aspect and the possible implementations of the first aspect. Specifically, a channel correction apparatus includes a corresponding component (means) configured to perform the step or the function described in the first aspect, and may be the first RRU. The step or the function may be implemented by using software, hardware, or a combination of software and hardware.

According to a third aspect, a second RRU is provided. The second RRU may be configured to perform the operation of the second RRU. Specifically, a channel correction apparatus includes a corresponding component (means) configured to perform the step or the function of the second RRU, and may be the second RRU. The step or the function may be implemented by using software, hardware, or a combination of software and hardware.

According to a fourth aspect, a channel correction device is provided and includes a processor, a transceiver, and a memory. The memory is configured to store a computer program. The transceiver is configured to perform the receiving/sending step in the channel correction method in any possible implementation of the first aspect. The processor is configured to: invoke the computer program from the memory, and run the computer program, so that the channel correction device performs the channel correction method in any possible implementation of the first aspect.

Optionally, there is one or more processors, and there is one or more memories.

Optionally, the memory may be integrated with the processor, or the memory and the processor are separately disposed.

Optionally, the transceiver includes a transmitter and a receiver.

According to a fifth aspect, a system is provided, and the system includes the channel correction apparatuses provided in the second aspect and the third aspect.

According to a sixth aspect, a computer program product is provided. The computer program product includes a computer program (which may also be referred to as a code or an instruction), and when the computer program is run, a computer is enabled to perform the method in any possible implementation of the first aspect.

According to a seventh aspect, a computer-readable medium is provided. The computer-readable medium stores a computer program (which may also be referred to as a code or an instruction), and when the computer program is run on a computer, the computer is enabled to perform the method in any possible implementation of the first aspect.

According to an eighth aspect, a chip system is provided, and includes a memory and a processor. The memory is configured to store a computer program. The processor is configured to: invoke the computer program from the memory, and run the computer program, so that a communications device in which the chip system is installed performs the method in any possible implementation of the first aspect.

According to the channel correction method and apparatus provided in the embodiments of this application, a transmit-end RRU sends correction reference signals to at least two antennas in a receive-end RRU through at least two antennas by using a power and a weight vector. In this way, a case in which transmit/receive channels between the two RRUs cannot be corrected due to an excessively low signal-to-noise ratio or an excessively high power of a correction reference signal received by the receive-end RRU can be avoided, thereby improving correction performance of the transmit/receive channels between the RRUs.

DESCRIPTION OF EMBODIMENTS

The following describes technical solutions of this application with reference to accompanying drawings.

The technical solutions of the embodiments of this application may be applied to various communications systems, such as: a global system for mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future 5th generation (5G) system, or a new radio (NR) system.

Figure 1A:
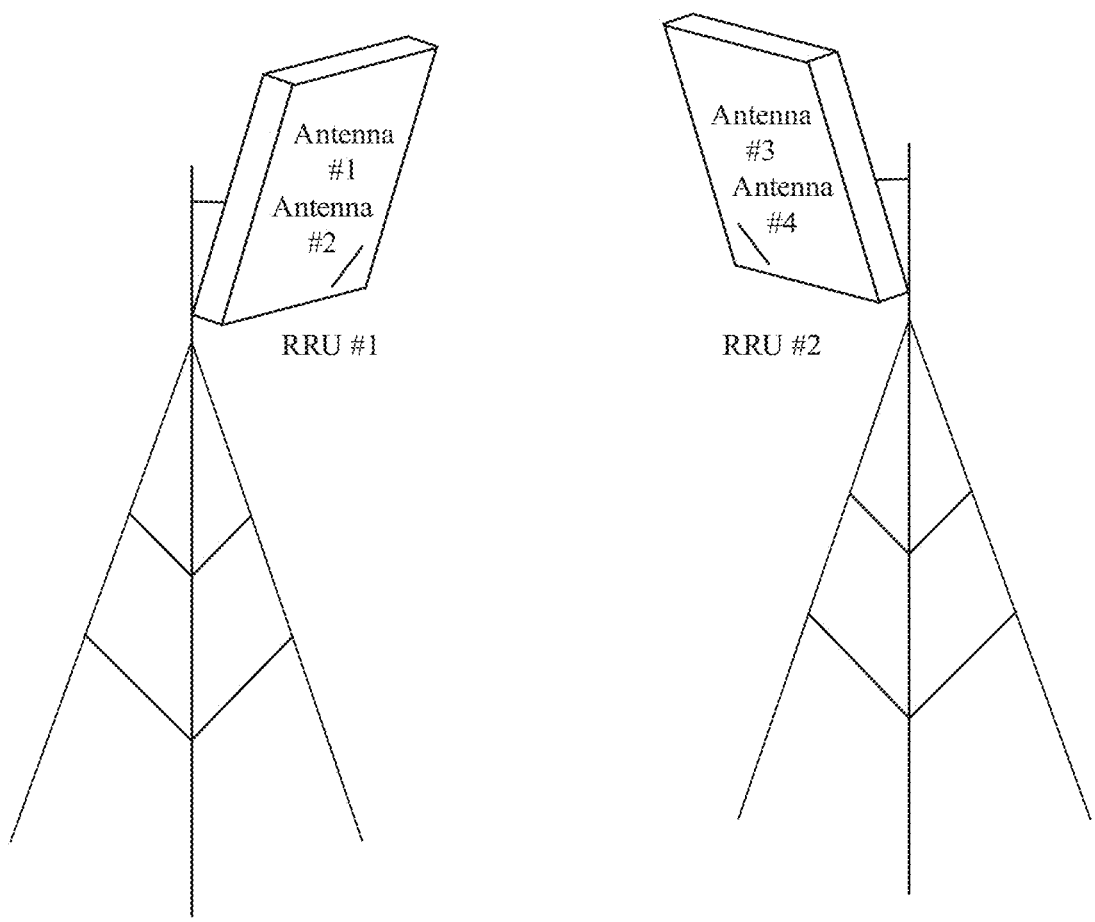
FIG. 1(a) and FIG. 1(b) show scenarios to which a channel correction method according to an embodiment of this application can be applied.
Figure 1B:
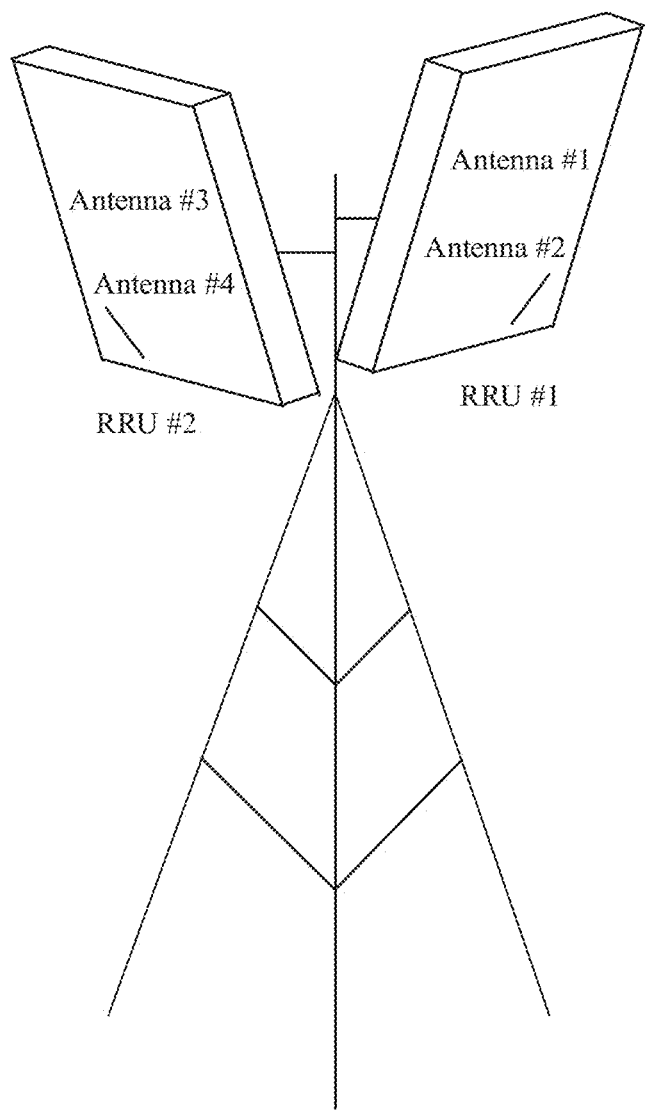

A scenario to which a channel correction method according to the embodiments of this application can be applied is first briefly described below with reference to FIG. 1. FIG. 1(a) is a diagram of a scenario to which a channel correction method according to an embodiment of this application is applicable. Two RRUs (an RRU #1 and an RRU #2 shown in FIG. 1(a)) are included. Different base station physical addresses are allocated to the two RRUs, in other words, there is a relatively long physical distance between the two RRUs. FIG. 1(b) is a diagram of another scenario to which a channel correction method according to an embodiment of this application is applicable. Two RRUs (an RRU #1 and an RRU #2 shown in FIG. 1(b)) are included. A same base station physical address is allocated to the two RRUs, in other words, there is a very short physical distance between the two RRUs. In other words, the RRU #1 and the RRU #2 shown in FIG. 1(a) may be referred to as two non-co-site RRUs. Similarly, the RRU #1 and the RRU #2 shown in FIG. 1(b) may be referred to as two co-site RRUs.

Specifically, the RRU #1 includes two antennas (an antenna #1 and an antenna #2), a transmit/receive channel #1 of the antenna #1 includes a transmit channel #1 and a receive channel #1, and a transmit/receive channel #2 of the antenna #2 includes a transmit channel #2 and a receive channel #2. The RRU #2 includes two antennas (an antenna #3 and an antenna #4), a transmit/receive channel #3 of the antenna #3 includes a transmit channel #3 and a receive channel #3, and a transmit/receive channel #4 of the antenna #4 includes a transmit channel #4 and a receive channel #4.

The channel correction method according to the embodiments of this application may be used to correct transmit/receive channels between the RRU #1 and the RRU #2. For example, the channel correction method is used to correct channel responses of the transmit/receive channel #1 and the transmit/receive channel #3, so that channel response ratios of the transmit/receive channel #1 and the transmit/receive channel #3 are the same.

It should be understood that FIG. 1 is merely an example for describing the scenario to which the channel correction method according to the embodiments of this application can be applied, and shall constitute no limitation on the protection scope of this application. For example, the embodiments of this application may be applied to perform channel correction between at least two RRUs, in other words, there may be at least two RRUs in FIG. 1. For another example, a quantity of antennas in each RRU is not limited in the embodiments of this application. In other words, there may be at least two antennas in the RRU in FIG. 1.

The scenario to which the channel correction method according to the embodiments of this application can be applied is briefly described above with reference to FIG. 1. To facilitate understanding of the channel correction method according to the embodiments of this application, several basic concepts in the embodiments of this application are first briefly described below.

1. RRU and BBU.

Figure 2:
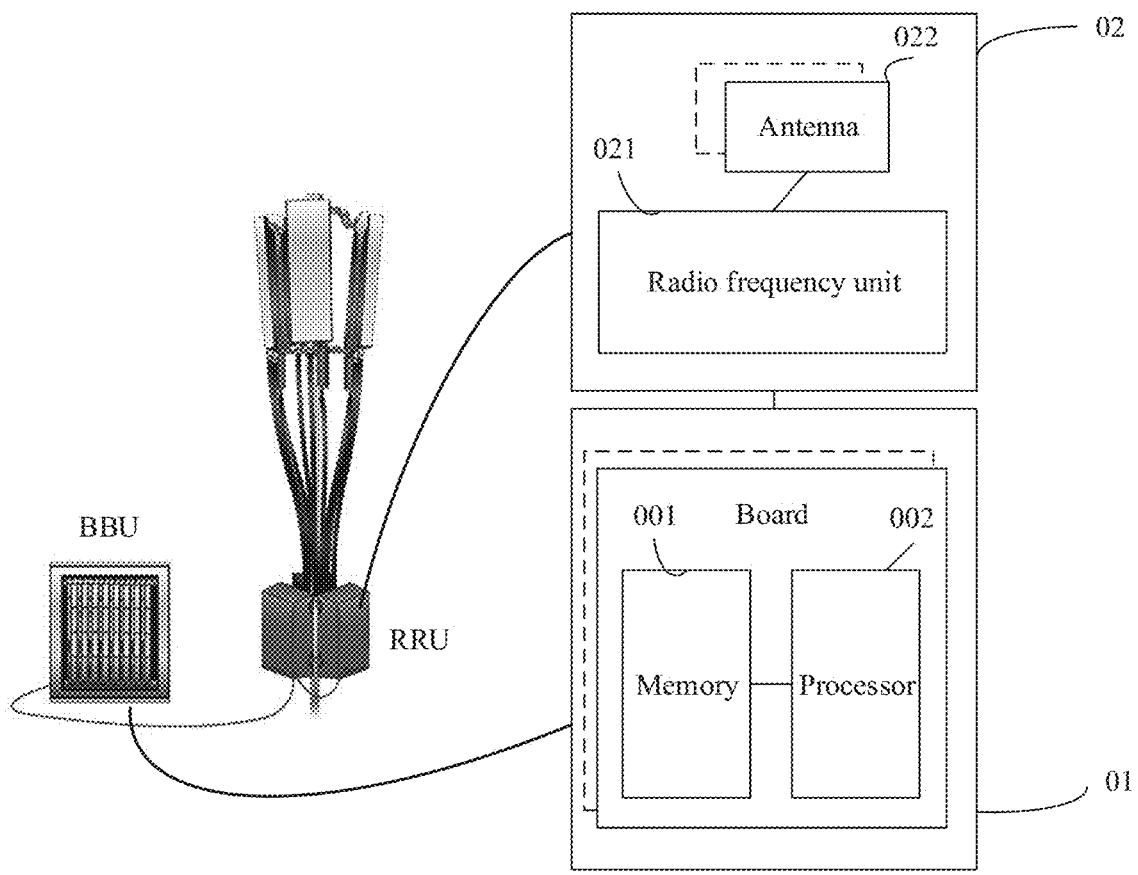
FIG. 2 is a schematic structural diagram of a connection between a BBU and an RRU according to an embodiment of this application.

FIG. 2 is a schematic structural diagram of a connection between a BBU and an RRU according to an embodiment of this application. The schematic structural diagram includes a remote radio unit (RRU) 02 and a baseband unit (BBU) 01 connected to the RRU by using an optical fiber. It should be understood that one BBU may be connected to a plurality of RRUs. The RRU includes a radio frequency unit 021 and at least one antenna 022. Specifically, the radio frequency unit 021 includes a digital intermediate frequency module, a transceiver module, a power amplification module, and a filter module (a specific internal module is not shown in FIG. 2). Usually, the RRU converts a baseband optical signal into a radio frequency signal at a remote end, and then amplifies and transmits the radio frequency signal. The digital intermediate frequency module is configured to perform modulation and demodulation, digital up- and down-frequency conversion, analog-to-digital (A/D) conversion, and the like in optical transmission. The transceiver module converts an intermediate frequency signal into a radio frequency signal, and then the radio frequency signal passes through the power amplification module and the filter module, and is transmitted through an antenna port.

A working principle of the RRU is as follows: in downlink, a baseband signal undergoes frequency conversion and filtering, passes through a radio frequency filter and a linear power amplifier, and then is transmitted to an antenna feeder by using a transmit filter. In uplink, a received uplink signal of a mobile terminal undergoes filtering, low-noise amplification, further radio frequency small signal amplification and filtering, down-frequency conversion, and then undergoes analog-to-digital conversion, digital intermediate frequency processing, and the like.

It should be understood that in the embodiments of this application, there is no hardware improvement to the RRU. Therefore, a specific form of the RRU is defined in the prior art. Details are not described in this application. Specifically, in this application, the RRU is referred to as a remote radio unit (RRU), which is merely a possible name. For example, the RRU may also be referred to as a radio remote unit (RRU).

The BBU may include one or more boards, and a plurality of boards may jointly support a radio access network (for example, an LTE system or a 5G system) of a single access standard, or may respectively support radio access networks of different access standards. The BBU 01 further includes a memory 001 and a processor 002. The memory 001 is configured to store a necessary instruction and data. The processor 002 is configured to control the RRU to perform a necessary action. However, in this application, there is no limitation that an action of the RRU is necessarily controlled by the BBU connected to the RRU. In this application, the RRU may further include a corresponding processor, to control the RRU to perform the necessary action. The memory 001 and the processor 002 may serve one or more boards. In other words, a memory and a processor may be separately disposed on each board. Alternatively, a plurality of boards may share a same memory and a same processor. In addition, a necessary circuit may be disposed on each board. When joint transmission (JT) is implemented by using a CoMP communications system, the BBU may control a plurality of RRUs to send downlink signals to a same terminal device through inter-cell coordination, to improve signal receiving quality of the terminal device.

2. Reciprocity.

Reciprocity refers to a feature that in the case of a single excitation, a response does not change with a transposition between an excitation port and a response port.

In the embodiments of this application, that transmit/receive channels between RRUs meet reciprocity means that all antennas between every two RRUs meet reciprocity. That antennas meet reciprocity may be understood as that in transmit/receive channels corresponding to a plurality of antennas, ratios of channel responses of receive channels to channel responses of transmit channels are the same.

3. Co-Site and Non-Co-Site.

Co-site in this application refers to a base station co-site system (BTS co-site system), that is, there is a short physical distance between a plurality of RRUs. For example, if a physical distance between two RRUs falls within 20 meters, the two RRUs are referred to as two co-site RRUs. Non-co-site refers to a base station non-co-site system, that is, there is a long physical distance between a plurality of RRUs. For example, if a physical distance between two RRUs is greater than 20 meters, the two RRUs are referred to as non-co-site RRUs.

4. Correction Reference Signal.

The correction reference signal in this application includes any one of the following sequences:

a sounding signal sequence that is generated by using a Zadoff-Chu sequence and that is defined in LTE, a Golay sequence defined in institute of electrical and electronics engineers (IEEE) 802.16e, another signal sequence with cross-correlation defined between cells, or the like.

It should be understood that a specific form of the correction reference signal is not limited in the embodiments of this application. The correction reference signal may be a correction reference signal used in an existing method for correcting transmit/receive channels between RRUs, or may be a correction reference signal that can be used for correcting transmit/receive channels between RRUs in subsequent development of a communications technology. Preferably, the entire operating bandwidth of a cell may be covered to send the correction reference signal.

5. Online Correction.

Reciprocity correction between transmit/receive channels between RRUs in this application is online correction, and the online correction means that correction needs to be performed in a use process. Offline correction corresponds to the online correction, and the offline correction is correction completed before delivery.

6. CSI.

In a time division duplexing (TDD) and multiple input multiple output (MIMO) system, a plurality of network devices that use a CoMP technology receive an uplink sounding reference signal (SRS) sent by a terminal device, and each network device obtains CSI of each antenna in each network device. Based on reciprocity of uplink and downlink CSI, the network device jointly designs downlink transmit weights of antennas in all network devices by using the uplink CSI, to obtain a space diversity gain and a spatial multiplexing gain. In a multiple input multiple output system, transmit diversity and receive diversity may provide a specific diversity gain, and are usually used to withstand multi-path fading. At a transmit end, a data stream is divided into a plurality of sub-data streams and transmitted through different antennas. In this way, a transmission rate can be improved without increasing a transmission power and bandwidth. This technology is referred to as a spatial multiplexing technology, and an increase in the transmission rate is referred to as a spatial multiplexing gain.

7. Weight Vector.

The weight vector in this application is a weight vector selected from a finite weight vector set, and is usually selected through traversal. It may be considered that the weight vector in this application is a weight vector in a preconfigured weight vector set.

Specifically, combining correction reference signals based on a weight vector in the embodiments of this application means obtaining a sum of values obtained after values of correction reference signals received by all antennas are multiplied by weights corresponding to the antennas in the weight vector, and sending a correction reference signal based on a weight vector in the embodiments of this application means that a correction reference signal sent by each antenna is a correction reference signal obtained after a preset correction reference signal is multiplied by a weight corresponding to each antenna in the weight vector.

8. Coherence Time.

The coherence time is a maximum time difference range in which a channel is kept constant. A same signal at a transmit end reaches a receive end within the coherence time. If fading features of signals are exactly the same, the receive end considers that the signals are a same signal.

The scenario to which the channel correction method according to the embodiments of this application can be applied and some related basic concepts are described above. As a fifth-generation mobile communications system is gradually commercially used, a network device starts to use a massive multiple input multiple output (MIMO) technology, that is, tens to hundreds of antennas are deployed in a same network device. In the massive MIMO technology, a spatial dimension of a wireless channel may be fully used, to significantly increase a cell capacity, and the massive MIMO technology has become a key technology in the fifth-generation mobile communications system. The massive MIMO technology may be integrated with a CoMP technology to further increase a rate of a cell-edge user, to achieve experience in a borderless cell that is centered on a terminal device.

To facilitate understanding of advantages of the channel correction method according to the embodiments of this application over an existing channel correction method, two existing channel correction methods and disadvantages of the existing channel correction methods are first described with reference to FIG. 3 and FIG. 4.

Figure 3:
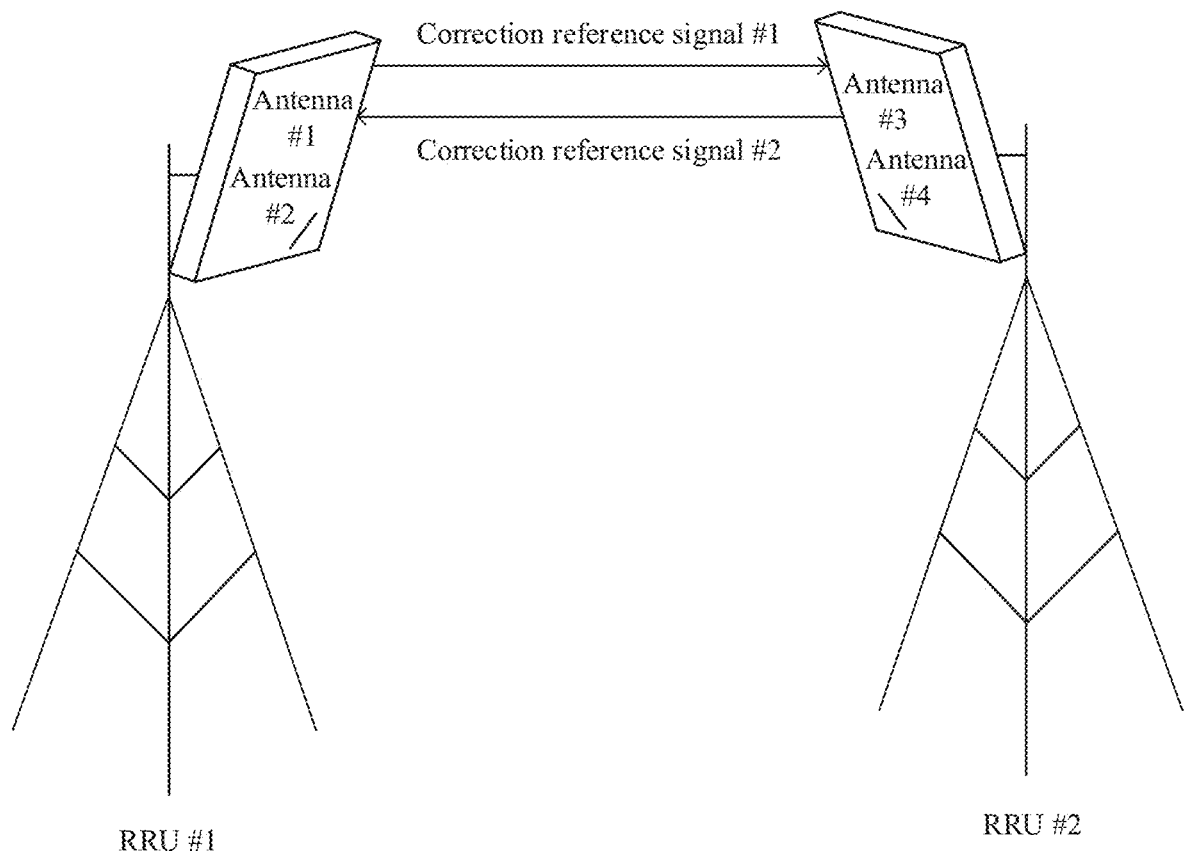
FIG. 3 is a schematic diagram of a channel correction method.

FIG. 3 is a schematic diagram of a channel correction method. An RRU #1 and an RRU #2 are included. The RRU #1 includes two antennas (an antenna #1 and an antenna #2), and the RRU #2 includes two antennas (an antenna #3 and an antenna #4).

Specifically, in the channel correction method shown in FIG. 3, each RRU uses a single antenna to complete correction of transmit/receive channels between the RRUs. The method mainly includes three steps.

Step 1: Determine a Transmit Power.

(1) The antenna #1 in the RRU #1 sends a correction reference signal #1 by using a power $P_{im}$ decibel-milliwatt (dBm), where m=0, 1, . . . , and $L_i$–1, and $L_i$ is a quantity of transmit powers in the RRU #1. When the antenna #1 in the RRU #1 transmits the correction reference signal #1 by using the $m^{th}$ transmit power value, the antenna #3 in the RRU #2 receives the correction reference signal #1. The RRU #2 determines whether a power and a signal-to-noise ratio of the received correction reference signal #1 meet a first preset requirement, and determines at least one transmit power that corresponds to the correction reference signal #1 and that meets the first preset requirement.

The quantity of transmit powers in the RRU #1 may be a preset transmit power set. For example, the transmit power set is {–40 dBm, –20 dBm, 20 dBm, 40 dBm}. In this case, the antenna #1 transmits a total of four correction reference signals #1. The first preset requirement is preset in the RRU #2. For example, the first preset requirement is that a power is less than a power threshold, and a signal-to-noise ratio is greater than a signal-to-noise ratio threshold. The power threshold and the signal-to-noise ratio threshold are two preset thresholds.

Specifically, when there are a plurality of transmit power values that correspond to the correction reference signal #1 and that meet the first preset requirement, the RRU #2 selects an appropriate value of $P_{im}$ from the plurality of transmit power values, and records the value as $P_{im*}$. When there is no transmit power value that corresponds to the correction reference signal #1 and that meets the first preset requirement, the RRU #2 determines that the RRU #1 and the RRU #2 are not connected, and channel correction cannot be performed between the RRU #1 and the RRU #2. For example, when the RRU #2 determines that powers and signal-to-noise ratios of correction reference signals #1 respectively transmitted by the antenna #1 by using powers of –20 dBm and 20 dBm meet the first preset requirement, the RRU #2 selects 20 dBm as $P_{im*}$ from the transmit power values of –20 dBm and 20 dBm.

(2) The antenna #3 in the RRU #2 sends a correction reference signal #2 by using a power $P_{jn}$ dBm, where n=0, 1, . . . , and $L_j$–1, and $L_j$ is a quantity of transmit powers in the RRU #2. When the antenna #3 in the RRU #2 transmits the correction reference signal #2 by using the $n^{th}$ transmit power value, the antenna #1 in the RRU #1 receives the correction reference signal #2. The RRU #1 determines whether a power and a signal-to-noise ratio of the received correction reference signal #2 meet a second preset requirement.

This is similar to the case in which the antenna #1 in the RRU #1 sends the correction reference signal #1 by using the power $P_{im}$. The quantity of transmit powers in the RRU #2 may be a preset transmit power set. For example, the transmit power set is {–60 dBm, –40 dBm, 40 dBm, 60 dBm}. In this case, the antenna #3 transmits a total of four correction reference signals #2. The second preset requirement is preset in the RRU #1, and is similar to the first preset requirement. Details are not described herein.

Specifically, when there are a plurality of transmit power values that correspond to the correction reference signal #2 and that meet the second preset requirement, the RRU #1 selects an appropriate value of $P_{jn}$ from the plurality of transmit power values, and records the value as $P_{jn*}$. When there is no transmit power value that corresponds to the correction reference signal #2 and that meets the second preset requirement, the RRU #1 determines that the RRU #1 and the RRU #2 are not connected, and channel correction cannot be performed between the RRU #1 and the RRU #2.

Step 2: Calculate a Correction Coefficient.

(1) The antenna #1 in the RRU #1 sends a correction reference signal #1 to the antenna #3 in the RRU #2 by using the power $P_{im*}$ dBm, and a correction reference signal received by the antenna #3 is a correction reference signal #1'.

(2) The antenna #3 in the RRU #2 sends a correction reference signal #2 to the antenna #1 in the RRU #1 by using the power $P_{jn*}$ dBm, and a correction reference signal received by the antenna #1 is a correction reference signal #2'.

(3) The correction coefficient is calculated based on the correction reference signal #1' received by the antenna #3 in the RRU #2 and the correction reference signal #2' received by the antenna #1 in the RRU #1. For example, the calculating the correction coefficient includes:

calculating a first ratio of the correction reference signal #2' received by the antenna #1 to the correction reference signal #2 sent by the antenna #3 and a second ratio of the correction reference signal #1' received by the antenna #3 to the correction reference signal #1 sent by the antenna #1, and using a result obtained by dividing the first ratio by the second ratio as a correction coefficient of channel response ratios of a transmit/receive channel of the antenna #1 and a transmit/receive channel of the antenna #3.

Step 3: Perform Channel Correction.

Channel responses of the transmit/receive channels between the RRU #1 and the RRU #2 are corrected by using the correction coefficient, so that channel response ratios of the transmit/receive channels between the RRU #1 and the RRU #2 are the same. For example, when a channel response ratio of a transmit/receive channel of the RRU #2 is used as a reference value, a channel response of a transmit channel of the RRU #1 may be multiplied by the correction coefficient, or a channel response of a receive channel of the RRU #1 is divided by the correction coefficient. When a channel response ratio of a transmit/receive channel of the RRU #1 is used as a reference value, a channel response of a transmit channel of the RRU #2 may be multiplied by the correction coefficient, or a channel response of a receive channel of the RRU #2 is divided by the correction coefficient.

However, the channel correction method shown in FIG. 3 has the following disadvantages:

1. In a non-co-site scenario (there is a relatively long physical distance between the RRU #1 and the RRU #2), there is a problem that correction cannot be performed due to an excessively low signal-to-noise ratio of the correction reference signal #2 received by the antenna #1 and/or an excessively low signal-to-noise ratio of the correction reference signal #1 received by the antenna #3. This is because when there is a relatively long physical distance between the RRU #1 and the RRU #2, there is a high air interface propagation loss for an electromagnetic wave, and the signal-to-noise ratio of the received correction reference signal is relatively low. Consequently, a problem that correction cannot be performed is caused. Particularly, when a network device uses a massive MIMO technology, the RRU uses a large-scale antenna array, a transmit power on a single antenna in the RRU is correspondingly reduced, and consequently the signal-to-noise ratio of the received correction reference signal is lower.

2. In a co-site scenario (there is a very short physical distance between the RRU #1 and the RRU #2), there is a problem that correction cannot be performed due to an excessively high power of the correction reference signal #2 received by the antenna #1 and/or an excessively high power of the correction reference signal #1 received by the antenna #3. There is a lower limit for a transmit power of the RRU at a correction moment. There is a very short physical distance, and therefore even if a minimum transmit power is used, there is still a problem that the received correction reference signal has an excessively high power. In this case, analog automatic gain control (AAGC) is enabled, and therefore correction cannot be performed.

Figure 4:
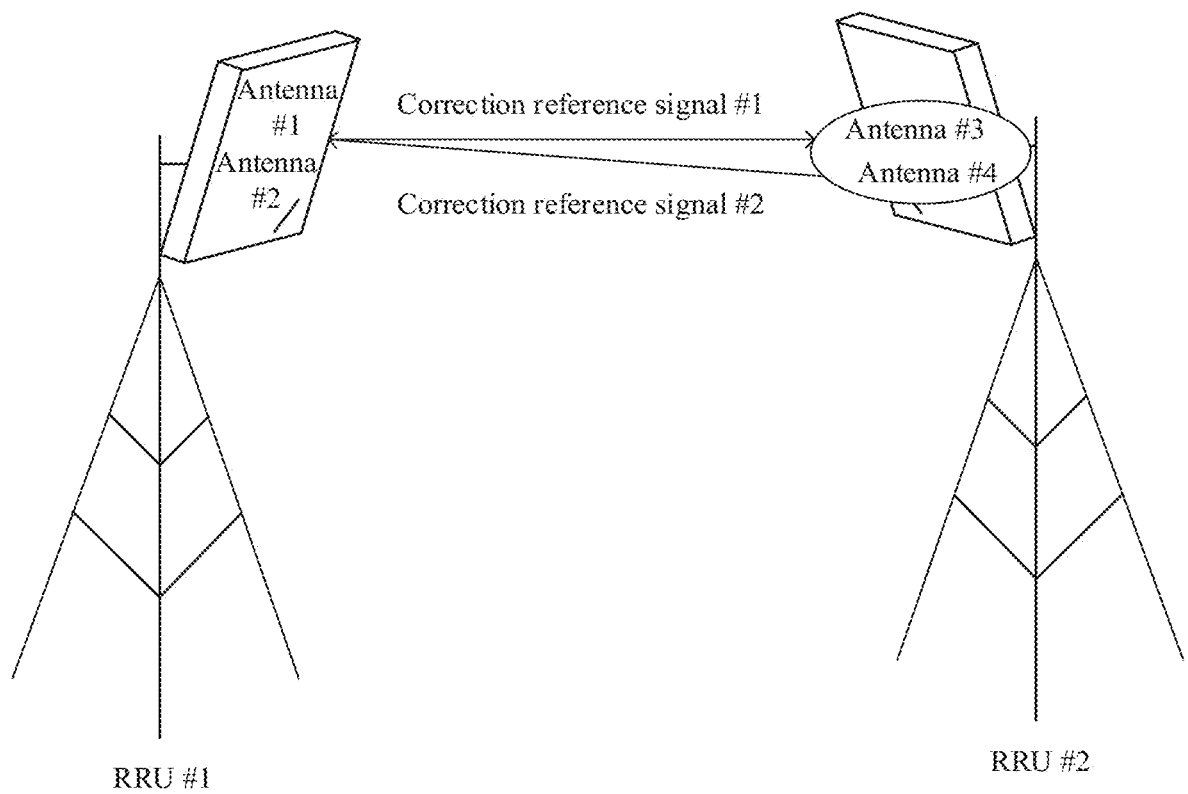
FIG. 4 is a schematic diagram of another channel correction method.

FIG. 4 is a schematic diagram of another channel correction method. An RRU #1 and an RRU #2 are included. The RRU #1 includes two antennas (an antenna #1 and an antenna #2), and the RRU #2 includes two antennas (an antenna #3 and an antenna #4).

Specifically, in the channel correction method shown in FIG. 4, the RRU #1 uses a dynamic weight and the RRU #2 uses a single antenna to complete correction of transmit/receive channels between the RRUs. The dynamic weight herein is a weight obtained through online calculation. The method mainly includes three steps.

Step 1: Obtain a Dynamic Weight.

The antenna #1 in the RRU #1 sends a correction reference signal #1 by using a default power. When the antenna #1 in the RRU #1 sends the correction reference signal #1 by using the default power, an antenna #k in the RRU #2 receives the correction reference signal #1, and the RRU #2 obtains a coefficient $\alpha_k$ of an air interface channel between the antenna #1 in the RRU #1 and the antenna #k in the RRU #2 through estimation. When channel correction is performed between the RRU #1 and the RRU #2, a dynamic weight $w_k$ of the antenna #k in the RRU #2 is equal to $(\alpha_k)^*$, where the superscript * represents a conjugate operation.

Step 2: Calculate a Correction Coefficient.

(1) When the antenna #1 in the RRU #1 sends the correction reference signal #1 by using the default power, both the antenna #3 and the antenna #4 in the RRU #2 receive the correction reference signal #1. The RRU #2 performs weighted summation on the correction reference signals #1 received by the antenna #3 and the antenna #4 to obtain one correction reference signal #1'. A weighting coefficient is the dynamic weight obtained through calculation in step 1. For example, the antenna #3 corresponds to a weighting coefficient $w_3$, and the antenna #4 corresponds to a weighting coefficient $w_4$.

(2) The antenna #3 and the antenna #4 in the RRU #2 respectively and simultaneously send correction reference signals #2 by using the default power. Specifically, when the antenna #3 and the antenna #4 respectively send the correction reference signals #2, the correction reference signal #2 transmitted by the antenna #3 is multiplied by the weighting coefficient $w_3$, and the correction reference signal #2 transmitted by the antenna #4 is multiplied by the weighting coefficient $w_4$. The antenna #1 in the RRU #1 receives a correction reference signal #2'.

(3) The correction coefficient is calculated based on the correction reference signal #1' received by the RRU #2 and the correction reference signal #2' received by the antenna #1 in the RRU #1. For example, the calculating the correction coefficient includes;

calculating a first ratio of the correction reference signal #2' to the correction reference signal #2 and a second ratio of the correction reference signal #1' to the correction reference signal #1, and using a result obtained by dividing the first ratio by the second ratio as a correction coefficient for correcting channel responses of the transmit/receive channels between the RRU #1 and the RRU #2.

Step 3: Perform Channel Correction.

The channel responses of the transmit/receive channels between the RRU #1 and the RRU #2 are corrected by using the correction coefficient, so that channel response ratios of the transmit/receive channels between the RRU #1 and the RRU #2 are the same. For example, a channel response of a transmit channel may be multiplied by the correction coefficient, or a channel response of a receive channel is divided by the correction coefficient.

However, the channel correction method shown in FIG. 4 has the following disadvantages:

1. In a co-site scenario (there is a very short physical distance between the RRU #1 and the RRU #2), there is a problem that correction cannot be performed due to an excessively high power of the correction reference signal #2 received by the RRU #1 and/or an excessively high power of the correction reference signal #1 received by the RRU #2. During transmission of the correction reference signal, no traversal of a transmit power is performed, and the correction reference signal is sent by using only the default value. After the dynamic weight is obtained, a power of the received correction reference signal is significantly increased. In this case, AAGC is enabled, and therefore correction cannot be performed.

2. There are high overheads in calculating the dynamic weight. There is a relatively short coherence time for the dynamic weight. In a worst-case scenario, a dynamic weight at a current moment needs to be obtained before each correction is performed. In this case, a correction solution has high complexity, and high time overheads need to be consumed for correction. Especially for a massive MIMO system, there is a relatively narrow dynamic beam, and the dynamic weight needs to be recalculated each time a channel spatial gain direction changes.

3. A Beam Gain of the RRU #1 is not Used.

To resolve the disadvantages in the channel correction methods shown in FIG. 3 and FIG. 4, the embodiments of this application provide a channel correction method in which an appropriate transmit power and an appropriate weight are selected by jointly traversing a transmit power set and a weight set to correct transmit/receive channels between RRUs, to improve correction performance of the transmit/receive channels between the RRUs. The channel correction method according to the embodiments of this application is described below in detail with reference to FIG. 5 to FIG. 9.

Figure 5:
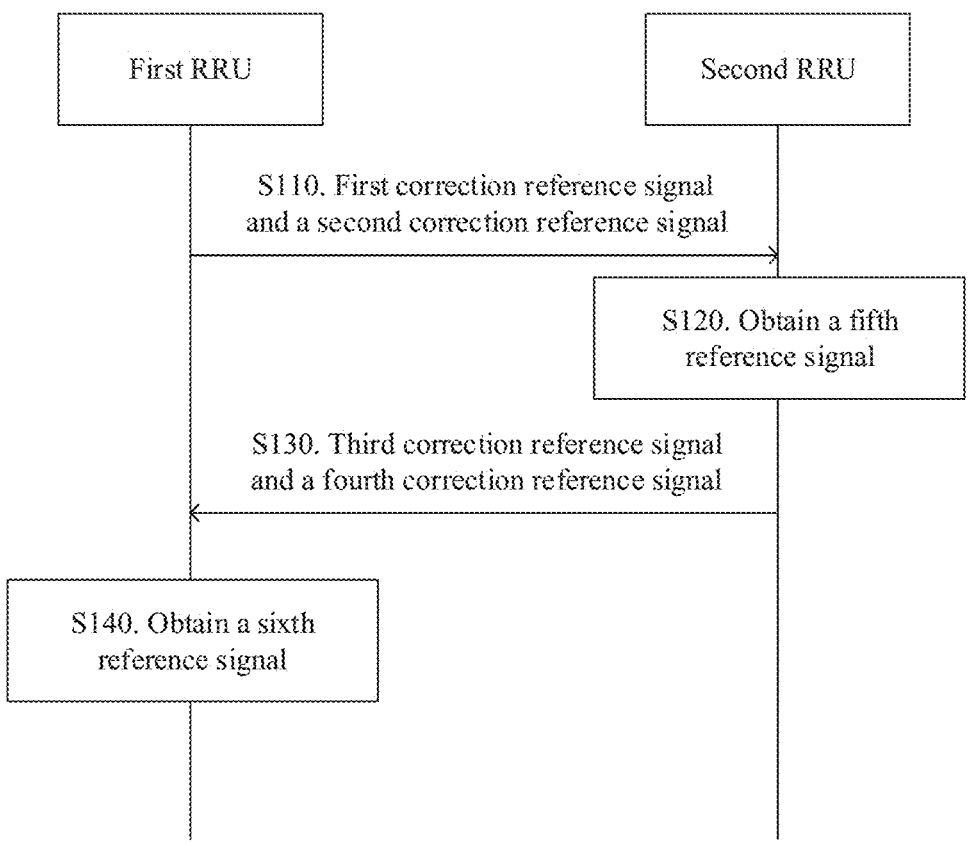
FIG. 5 is a schematic flowchart of a channel correction method according to an embodiment of this application.

FIG. 5 is a schematic flowchart of a channel correction method according to an embodiment of this application. The method includes a first RRU, a second RRU, and steps S110 to S140. The first RRU includes a first antenna and a second antenna, the second RRU includes a third antenna and a fourth antenna, and each antenna has a corresponding transmit/receive channel.

S110. The first RRU sends a first correction reference signal and a second correction reference signal to the second RRU.

The first RRU and the second RRU are any two RRUs in a communications system that includes at least two RRUs. The channel correction method provided in this embodiment of this application can be applied to correct transmit/receive channels between every two of a plurality of RRUs. Only for ease of description, in this embodiment, two RRUs (the first RRU and the second RRU) are used as an example for description. A procedure of correcting the transmit/receive channels between the every two of the plurality of RRUs is similar to a procedure of correcting transmit/receive channels between the two RRUs. Details are not described in this application.

That the first RRU includes a first antenna and a second antenna, and the second RRU includes a third antenna and a fourth antenna is merely an example, and shall constitute no limitation on this application. In this embodiment of this application, the RRU may include at least two antennas, and each of a plurality of antennas sends and/or receives the correction reference signal, or at least two of a plurality of antennas send and/or receive the correction reference signal. Description is provided below with reference to specific embodiments. Details are not described herein.

It should be understood that descriptions such as "first", "second", and "third" in this application are merely used for distinction, and shall constitute no limitation. For example, "first" and "second" in the first RRU and the second RRU are merely used to distinguish between different RRUs, and "first" and "second" in the first antenna and the second antenna are merely used to distinguish between different antennas.

Specifically, the first RRU sends the first correction reference signal to the third antenna and the fourth antenna in the second RRU through the first antenna in the first RRU by using a first transmit power and a first weight vector, and the first RRU sends the second correction reference signal to the third antenna and the fourth antenna in the second RRU through the second antenna in the first RRU by using the first transmit power and the first weight vector. The first transmit power is a transmit power in a first transmit power set in the first RRU, and the first weight vector is a weight vector in a first weight vector set in the first RRU.

A value and a quantity of transmit powers included in the first transmit power set may be values preset based on a capability of the first RRU. The first weight vector set may be a vector set designed by a developer, or may be a vector in an existing protocol. In other words, in this embodiment of this application, the first transmit power set and the first weight vector set are not limited, and may be existing sets or newly designed sets.

Specifically, the first weight vector includes two elements, which respectively correspond to the first antenna and the second antenna. The first correction reference signal sent by the first RRU through the first antenna is a correction reference signal obtained after a preset correction reference signal is multiplied by a weight corresponding to the first antenna in the first weight vector. Similarly, the second correction reference signal sent by the first RRU through the second antenna is obtained after the preset correction reference signal is multiplied by a weight corresponding to the second antenna in the first weight vector. The weight corresponding to the first antenna in the first weight vector is a non-zero element, and the weight corresponding to the second antenna in the first weight vector is also a non-zero element.

Particularly, when the weight corresponding to the first antenna in the first weight vector is 0, it indicates that the first antenna does not send the first correction reference signal.

It should be understood that in this application, description is provided by using the first antenna and the second antenna included in the first RRU as an example. If the first RRU includes X antennas (X is an integer greater than or equal to 2), the first RRU may send the correction reference signal to the third antenna and the fourth antenna in the second RRU through each of the X antennas by using the first transmit power and the first weight vector. In this case, the first weight vector includes X elements, which respectively correspond to the X antennas. A correction reference signal sent by each antenna is obtained after the preset correction reference signal is multiplied by a weight corresponding to the antenna in the first weight vector. At least two of the X elements are non-zero elements.

In an example of extension, there are a total of N RRUs between which transmit/receive channels need to be corrected, and the N RRUs are respectively numbered 0, 1, . . . , and N−1. Specifically, an antenna in an RRU i (i=0, 1, . . . , and N−1) sends a correction reference signal by using a transmit power $P_{im*}$ dBm and a weight vector $w_{ib*}$, and a weight of a first correction reference signal transmitted by a $k^{th}$ antenna in the RRU i is a $k^{th}$ element in $w_{ib*}$, where $P_{im*}$ dBm is a transmit power that meets a preset condition in a transmit power set ($P_{im}$ dBm, m=0, 1, . . . , and $L_i$−1) in the RRU i, $w_{ib*}$ is a weight vector that meets the preset condition in a weight vector set ($w_{ib}$, b=0, 1, . . . , and $B_i$−1) in the RRU i, $L_i$ is a quantity of transmit powers in the RRU i, and $B_i$ is a quantity of weight vectors in the RRU i.

S120. The second RRU obtains a fifth correction reference signal.

After both the third antenna and the fourth antenna in the second RRU receive the correction reference signals, the second RRU combines the correction reference signals received by the third antenna and the fourth antenna into the fifth correction reference signal.

For example, the fifth correction reference signal is obtained by adding a correction reference signal obtained after the correction reference signal received by the third antenna is multiplied by a weight corresponding to the third antenna in a second weight vector and a correction reference signal obtained after the correction reference signal received by the fourth antenna is multiplied by a weight corresponding to the fourth antenna in the second weight vector.

For example, the second weight vector includes two elements, which respectively correspond to the third antenna and the fourth antenna.

It should be understood that in this application, description is provided by using the third antenna and the fourth antenna included in the second RRU as an example. If the second RRU includes Y antennas (Y is an integer greater than or equal to 2), each of the Y antennas may receive the correction reference signal sent by the first RRU. In this case, the second weight vector includes Y elements, which respectively correspond to the Y antennas. The fifth correction reference signal is a sum of values obtained after first correction reference signals received by the Y antennas are multiplied by weights corresponding to the Y antennas in the second weight vector.

In an example of extension, when the antenna in the RRU i sends the correction reference signal by using the transmit power $P_{im*}$ dBm and the weight vector $w_{ib*}$, correction reference signals respectively received by all antennas in an RRU j (j=0, 1, . . . , and N−1, and j≠i) are multiplied by weights respectively corresponding to all the antennas in a weight vector $w_{jd*}$, and then summation is performed to obtain one correction reference signal.

S130. The second RRU sends a third correction reference signal and a fourth correction reference signal to the first RRU.

Specifically, the second RRU sends the third correction reference signal to the first antenna and the second antenna in the first RRU through the third antenna in the second RRU by using a second transmit power and the second weight vector, and the second RRU sends the fourth correction reference signal to the first antenna and the second antenna in the first RRU through the fourth antenna in the second RRU by using the second transmit power and the second weight vector. The second transmit power is a transmit power in a second transmit power set in the second RRU, and the second weight vector is a weight vector in a second weight vector set in the second RRU.

A value and a quantity of transmit powers included in the second transmit power set may be values preset based on a capability of the second RRU. The second weight vector set may be a vector set designed by the developer, or may be a vector in the existing protocol. In other words, in this embodiment of this application, the second transmit power set and the second weight vector set are not limited, and may be existing sets or newly designed sets.

Specifically, the second weight vector includes two elements, which respectively correspond to the third antenna and the fourth antenna. The third correction reference signal sent by the third antenna is obtained after the preset correction reference signal is multiplied by the weight corresponding to the third antenna in the second weight vector. Similarly, the fourth correction reference signal sent by the fourth antenna is obtained after the preset correction reference signal is multiplied by the weight corresponding to the fourth antenna in the second weight vector.

It should be understood that in this application, description is provided by using the third antenna and the fourth antenna included in the second RRU as an example. If the second RRU includes Y antennas (Y is an integer greater than or equal to 2), the second RRU may send the correction reference signal to the first antenna and the second antenna in the first RRU through each of the Y antennas by using the second transmit power and the second weight vector. In this case, the second weight vector includes Y elements, which respectively correspond to the Y antennas. At least two of the Y elements are non-zero elements. A correction reference signal sent by each antenna is obtained after the preset correction reference signal is multiplied by a weight corresponding to the antenna in the second weight vector.

In an example of extension, there are a total of N RRUs between which transmit/receive channels need to be corrected, and the N RRUs are respectively numbered 0, 1, . . . , and N−1. Specifically, when the antenna in the RRU j (j=0, 1, . . . , and N−1) sends a correction reference signal by using a transmit power $P_{jn*}$ dBm and the weight vector $w_{jd*}$, a weight of a second correction reference signal transmitted by an $l^{th}$ antenna in the RRU j is an $l^{th}$ element in $w_{jd*}$, where $P_{jn*}$ dBm is a transmit power that meets the preset condition in a transmit power set ($P_{jn}$ dBm, n=0, 1, . . . , and $L_j−1$) in the RRU j, $w_{jd*}$ is a weight vector that meets the preset condition in a weight vector set ($w_{jd*}$, d=0, 1, . . . , and $B_j−1$) in the RRU j, $L_j$ is a quantity of transmit powers in the RRU j, and $B_j$ is a quantity of weight vectors in the RRU j.

S140. The first RRU obtains a sixth correction reference signal.

After both the first antenna and the second antenna in the first RRU receive the correction reference signals, the first RRU combines the correction reference signals received by the first antenna and the second antenna into the sixth correction reference signal.

For example, the sixth correction reference signal is obtained by adding a correction reference signal obtained after the correction reference signal received by the first antenna is multiplied by the weight corresponding to the first antenna in the first weight vector and a correction reference signal obtained after the correction reference signal received by the second antenna is multiplied by the weight corresponding to the second antenna in the first weight vector.

For example, the first weight vector includes two elements, which respectively correspond to the first antenna and the second antenna.

It should be understood that in this application, description is provided by using the first antenna and the second antenna included in the first RRU as an example. If the first RRU includes X antennas (X is an integer greater than or equal to 2), the first RRU may receive, through each of the X antennas, the correction reference signal sent by the second RRU. In this case, the first weight vector includes X elements, which respectively correspond to the X antennas. The sixth correction reference signal is a sum of values obtained after correction reference signals received by the X antennas are multiplied by weights corresponding to the X antennas in the first weight vector.

For example, when the antenna in the RRU j sends the correction reference signal by using the transmit power $P_{jn*}$ dBm and the weight vector $w_{jd*}$, correction reference signals respectively received by all antennas in the RRU i (i=0, 1, . . . , and N−1, and j≠i) are multiplied by weights respectively corresponding to all the antennas in the weight vector $w_{ib^*}$, and then summation is performed to obtain one correction reference signal.

After the fifth correction reference signal and the sixth correction reference signal are obtained, a correction coefficient of transmit/receive channels between the first RRU and the second RRU can be calculated based on the fifth correction reference signal and the sixth correction reference signal.

It should be understood that in this application, a method for calculating the correction coefficient of the transmit/receive channels between the first RRU and the second RRU based on the two correction reference signals is not described, and may be an existing method, in the prior art, for calculating the correction coefficient of the transmit/receive channels between the first RRU and the second RRU based on the two correction reference signals, or may be another method that is for calculating the correction coefficient of the transmit/receive channels between the first RRU and the second RRU based on the two correction reference signals and that is provided in a development process of a communications technology.

It should be further understood that an execution body for calculating the correction coefficient may be the first RRU, the second RRU, a BBU connected to the first RRU, a BBU connected to the second RRU, or another management device.

For solution integrity, in this application, an existing method for calculating the correction coefficient of the transmit/receive channels between the first RRU and the second RRU based on two correction reference signals is used as an example to briefly describe how to calculate the correction coefficient after the fifth correction reference signal and the sixth correction reference signal are obtained in this application:

calculating a first ratio of the correction reference signal received and obtained through combination by the first RRU to the correction reference signal sent by the second RRU and a second ratio of the correction reference signal received and obtained through combination by the second RRU to the correction reference signal sent by the first RRU, and using a result obtained by dividing the first ratio by the second ratio as the correction coefficient of channel response ratios of the transmit/receive channels between the first RRU and the second RRU.

It should be understood that after the correction coefficient is obtained, the transmit/receive channels between the first RRU and the second RRU may be corrected, which may include:

correcting channel responses of the transmit/receive channels by using the correction coefficient, so that channel response ratios of the transmit and receive channels are the same. For example, a channel response of a transmit channel may be multiplied by the correction coefficient, or a channel response of a receive channel is divided by the correction coefficient.

Specifically, the first RRU and the second RRU shown in FIG. 5 may be the RRU #1 and the RRU #2 shown in FIG. 1(*a*), or the first RRU and the second RRU shown in FIG. 5 may be the RRU #1 and the RRU #2 shown in FIG. 1(*b*).

In an implementation, the first RRU can determine a transmit power in the first transmit power set and a weight vector in the first weight vector set that are to be used to send the first correction reference signal to the antenna in the second RRU, and the second RRU can determine a transmit power in the second transmit power set and a weight vector in the second weight vector set that are to be used to send the second correction reference signal to the antenna in the first RRU.

For example, there is an optional set that includes at least one optional subset, and a first optional subset in the at least one optional subset includes the first transmit power, the first weight vector, the second transmit power, and the second weight vector.

It should be understood that the optional subset in this embodiment of this application is a set that includes four elements: a transmit power and a weight vector that can be used by the first RRU and a transmit power and a weight vector that can be used by the second RRU. The optional set is a set that includes at least one optional subset. For example, the optional set includes M elements, and four elements in the M elements form an optional subset.

How to determine the optional set before the method procedure shown in FIG. 5 is performed is described below in detail with reference to FIG. 6. It is assumed herein that the first transmit power set includes L1 transmit powers, the first weight vector set includes B1 weight vectors, the second transmit power set includes L2 transmit powers, and the second weight vector set includes B2 weight vectors, where L1, B1, L2, and B2 are positive integers. Specifically, an execution body for determining the optional set is not limited in this embodiment of this application, and may be the first RRU, the second RRU, the BBU connected to the first RRU, the BBU connected to the second RRU, or another device. In this application, it only needs to be ensured that regardless of a device that is used to determine the optional set, the first RRU and the second RRU can finally send, by using a power and a weight vector included in a specific optional subset in the optional set, the correction reference signals that need to be respectively sent by the first RRU and the second RRU in the embodiment shown in FIG. 5. For example, after determining the optional set, the another device may notify the first RRU and the second RRU of a result. In addition, when powers and signal-to-noise ratios of the correction reference signals received by the first RRU and the second RRU need to be used in a process of determining the optional set by the another device, the first RRU and the second RRU may send the corresponding powers and signal-to-noise ratios to the device.

Figure 6:
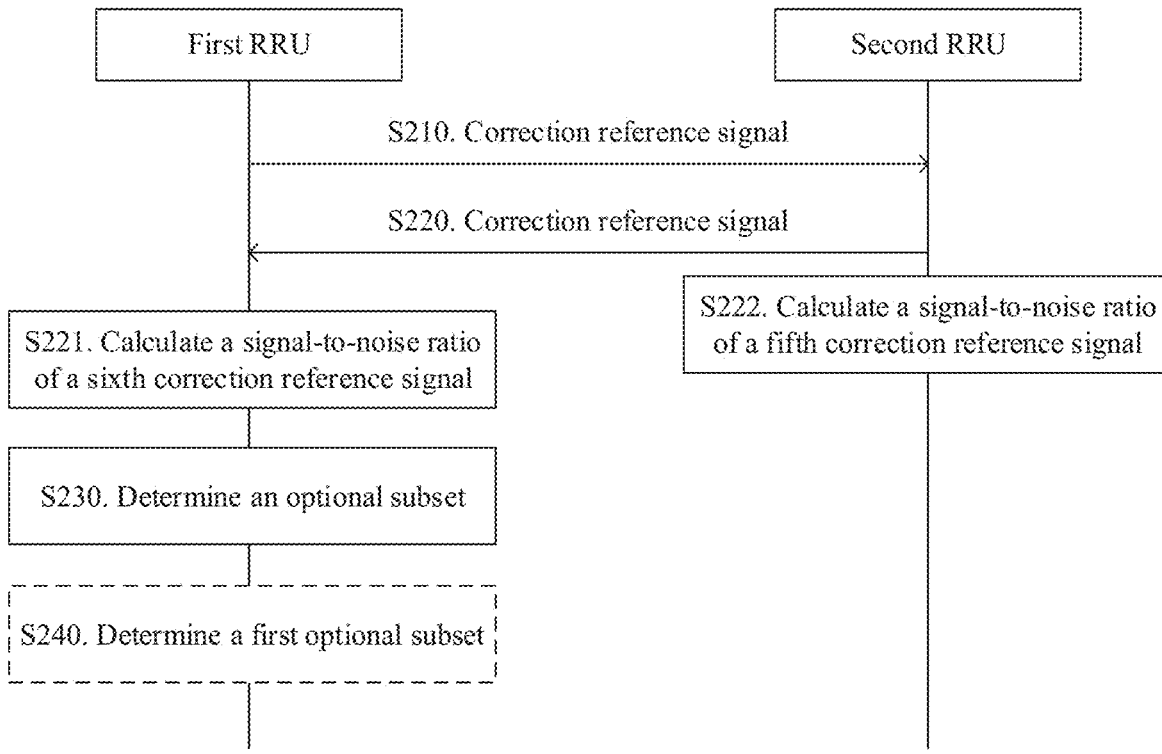
FIG. 6 is a schematic flowchart of another channel correction method according to an embodiment of this application.

FIG. 6 is a schematic flowchart of another channel correction method according to an embodiment of this application. The method includes a first RRU, a second RRU, and steps S210 to S240. The first RRU includes a first antenna and a second antenna, and the second RRU includes a third antenna and a fourth antenna.

S210. The first RRU sends a correction reference signal to the second RRU.

It is assumed that the foregoing first transmit power set includes L1 transmit powers, and the foregoing first weight vector set includes B1 weight vectors.

To determine the foregoing first transmit power and the foregoing first weight vector, the first RRU respectively sends L1*B1 correction reference signals to the antennas in the second RRU through all antennas in the first RRU by using the L1 transmit powers and the B1 weight vectors.

For example, the first RRU traverses the B1 weight vectors by using a $0^{th}$ transmit power value in the first transmit power set, then traverses the B1 weight vectors by using a first transmit power value in the first transmit power set, and so on. Different transmit power values are traversed through time division, and different weight vectors may be traversed through time division, frequency division (comb division), or code division. Alternatively, the antenna in the first RRU traverses the L1 transmit powers by using a $0^{th}$ weight vector in the first weight vector set, then traverses the L1 transmit powers by using a first weight vector in the first weight vector set, and so on. Different weight vectors are traversed through time division, and different transmit powers may be traversed through time division, frequency division (comb division), or code division, or may be randomly traversed.

For example, the first RRU sends the correction reference signal to each of the third antenna and the fourth antenna through the first antenna and the second antenna in the first RRU by using the first transmit power and the first weight vector. The first transmit power is any one of the L1 transmit powers in the first transmit power set, and the first weight vector is any one of the B1 weight vectors in the first weight vector set.

For example, there are a total of N RRUs between which transmit/receive channels need to be corrected, and the N RRUs are respectively numbered 0, 1, . . . , and N−1. An antenna in an RRU i (i=0, 1, . . . , and N−1) sends a correction reference signal to an antenna in an RRU j (j=0, 1, . . . , and N−1, and j≠i) by using a power $P_{im}$ dBm and a weight vector $w_{ib}$, and a weight of a correction reference signal sent by a $k^{th}$ antenna in the RRU i is a $k^{th}$ element in $w_{ib}$, where m=0, 1, . . . , and $L_i$−1, b=0, 1, . . . , and $B_i$−1, $L_i$ is a quantity of transmit powers in a first transmit power set in the RRU i, and $B_i$ is a quantity of weight vectors in a first weight vector set in the RRU i.

S220. The second RRU sends a correction reference signal to the first RRU.

It is assumed that the foregoing second transmit power set includes L2 transmit powers, and the foregoing second weight vector set includes B2 weight vectors.

To determine the foregoing second transmit power and the foregoing second weight vector, the second RRU respectively sends L2*B2 correction reference signals to the antennas in the first RRU through all antennas in the second RRU by using the L2 transmit powers and the B2 weight vectors.

For example, the second RRU traverses the B2 weight vectors by using a $0^{th}$ transmit power value in the second transmit power set, then traverses the B2 weight vectors by using a first transmit power value in the second transmit power set, and so on. Different transmit power values are traversed through time division, and different weight vectors may be traversed through time division, frequency division (comb division), or code division. Alternatively, the antenna in the second RRU traverses the L2 transmit powers by using a $0^{th}$ weight vector in the second weight vector set, then traverses the L2 transmit powers by using a first weight vector in the second weight vector set, and so on. Different weight vectors are traversed through time division, and different transmit powers may be traversed through time division, frequency division (comb division), or code division, or may be randomly traversed.

For example, the second RRU sends the correction reference signal to each of the first antenna and the second antenna through the third antenna and the fourth antenna in the second RRU by using the second transmit power and the second weight vector. The second transmit power is any one of the L2 transmit powers in the second transmit power set, and the second weight vector is any one of the B2 weight vectors in the second weight vector set.

For example, there are a total of N RRUs between which transmit/receive channels need to be corrected, and the N RRUs are respectively numbered 0, 1, . . . , and N−1. The antenna in the RRU j (j=0, 1, . . . , and N−1) sends a correction reference signal to the antenna in the RRU i (i=0, 1, . . . , and N−1, and j≠i) by using a power $P_{jn}$ dBm and a weight vector $w_{jd}$, and a weight on an $l^{th}$ antenna in the RRU j is an $l^{th}$ element in $w_{jd}$, where n=0, 1, . . . , and $L_j$−1, d=0, 1, . . . , and $B_j$−1, $L_j$ is a quantity of transmit powers in a second transmit power set in the RRU j, and $B_j$ is a quantity of weight vectors in a second weight vector set in the RRU j.

S230. Determine an optional subset.

For example, the first RRU sends the correction reference signal to each of the third antenna and the fourth antenna in the second RRU through the first antenna and the second antenna in the first RRU by using a transmit power 1 in the first transmit power set and a weight vector 1 in the first weight vector set, and the second RRU sends the correction reference signal to each of the first antenna and the second antenna in the first RRU through the third antenna and the fourth antenna in the second RRU by using a transmit power 2 in the second transmit power set and a weight vector 2 in the second weight vector set. In this case, it may be considered that the transmit power 1, the weight vector 1, the transmit power 2, and the weight vector 2 form a potential optional subset.

The potential optional subset corresponds to a receive power 1, a receive power 2, a receive power 3, a receive power 4, a signal-to-noise ratio 1, and a signal-to-noise ratio 2. A condition that needs to be met by the potential optional subset to become the optional subset is that the receive power 1, the receive power 2, the receive power 3, and the receive power 4 meet a preset power threshold, and the signal-to-noise ratio 1 and the signal-to-noise ratio 2 meet a preset signal-to-noise ratio threshold. For the potential optional subset, the corresponding receive power 1 is a power of a correction reference signal received by the first antenna, the corresponding receive power 2 is a power of a correction reference signal received by the second antenna, the corresponding receive power 3 is a power of a correction reference signal received by the third antenna, the corresponding receive power 4 is a power of a correction reference signal received by the fourth antenna, the corresponding signal-to-noise ratio 1 is a signal-to-noise ratio of a correction reference signal obtained after the correction reference signals received by the first antenna and the second antenna are combined based on the weight vector 1, and the corresponding signal-to-noise ratio 2 is a signal-to-noise ratio of a correction reference signal obtained after the correction reference signals received by the third antenna and the fourth antenna are combined based on the weight vector 2.

It may be learned from the condition that needs to be met by the potential optional subset to become the optional subset that the foregoing first optional subset that includes the first transmit power, the first weight vector, the second transmit power, and the second weight vector needs to meet the condition.

Specifically, the first optional subset corresponds to a first receive power, a second receive power, a third receive power, a fourth receive power, a signal-to-noise ratio of a fifth correction reference signal, and a signal-to-noise ratio of a sixth correction reference signal. The first receive power, the second receive power, the third receive power, and the fourth receive power meet the preset power threshold, and the signal-to-noise ratio of the fifth correction reference signal and the signal-to-noise ratio of the sixth correction reference signal meet the preset signal-to-noise ratio threshold.

The first receive power is the power of the correction reference signal received by the first antenna, the second receive power is the power of the correction reference signal received by the second antenna, the third receive power is the power of the correction reference signal received by the third antenna, and the fourth receive power is the power of the correction reference signal received by the fourth antenna.

For example, the foregoing embodiment is extended. When the RRU i transmits the correction reference signal by using the $m^{th}$ transmit power value and the $b^{th}$ weight vector, a power of a correction reference signal received by the $l^{th}$ antenna in the RRU j (j=0, 1, ..., and N−1, and j≠i) is denoted as a correction reference signal received power (reference signal received power, RSRP) $RSRP_{imb,jl}$, and the RRU j combines correction reference signals received by all antennas into one correction reference signal based on the weight vector $w_{jd}$. A signal-to-noise ratio of the correction reference signal is denoted as $SNR_{imb,jd}$, and the weight on the $l^{th}$ antenna is the $l^{th}$ element in $w_{jd}$. When the RRU j transmits the correction reference signal by using the $n^{th}$ transmit power value and the $d^{th}$ weight vector, a power of a correction reference signal received by the $k^{th}$ antenna in the RRU i (i=0, 1, ..., and N−1, and j≠i) is denoted as $RSRP_{jnd,ik}$, and the RRU i combines correction reference signals received by all antennas into one correction reference signal based on the weight vector $w_{ib}$. A signal-to-noise ratio of the correction reference signal is denoted as $SNR_{jnd,ib}$, and the weight on the $k^{th}$ antenna is the $k^{th}$ element in $w_{ib}$.

When $RSRP_{imb,jl} < Th_{Upper}$, $RSRP_{jnd,ik} < Th_{Upper}$, $SNR_{imb,jd} > Th_{Lower}$, and $SNR_{jnd,ib} > Th_{Lower}$ are met, the first transmit power, the first weight vector, the second transmit power, and the second weight vector $\{P_{im}, w_{ib}, P_{jn}, w_{jd}\}$ form an optional subset $C_{imb,jnd}$, where $Th_{Upper}$ represents an upper limit of a power of a received correction reference signal, $Th_{Lower}$ represents a lower limit of the power of the received correction reference signal, l is a sequence number of a non-zero element in $w_{jd}$, and k is a sequence number of a non-zero element in $w_{ib}$. If there is no optional subset, the RRU i and the RRU j are not connected, and correction cannot be performed.

For example, before S230, FIG. 6 further includes S221 of calculating the signal-to-noise ratio of the sixth correction reference signal and S222 of calculating the signal-to-noise ratio of the fifth correction reference signal.

For example, an execution body for calculating the signal-to-noise ratio of the sixth correction reference signal may be the first RRU, a BBU connected to the first RRU, or another management device.

Specifically, the signal-to-noise ratio of the sixth correction reference signal may be calculated after the first antenna and the second antenna receive the correction reference signals sent by the third antenna and the fourth antenna by using the second transmit power and the second weight vector. The correction reference signals received by the first antenna and the second antenna are combined based on the first weight vector to obtain the sixth correction reference signal, and the signal-to-noise ratio of the sixth correction reference signal is calculated. Alternatively, the correction reference signals received by the first antenna and the second antenna may be combined based on each weight vector in the first weight vector set to obtain a combined correction reference signal, and a signal-to-noise ratio of the combined correction reference signal is calculated.

Similarly, the signal-to-noise ratio of the fifth correction reference signal may be calculated after the third antenna and the fourth antenna receive the correction reference signals sent by the first antenna and the second antenna by using the first transmit power and the first weight vector. The correction reference signals received by the third antenna and the fourth antenna are combined based on the second weight vector to obtain the fifth correction reference signal, and the signal-to-noise ratio of the fifth correction reference signal is calculated. Alternatively, the correction reference signals received by the third antenna and the fourth antenna may be combined based on each weight vector in the second weight vector set to obtain a combined correction reference signal, and a signal-to-noise ratio of the combined correction reference signal is calculated.

It should be understood that an execution body for determining the optional subset may be the first RRU. For example, the second RRU sends a calculated power of the received correction reference signal and the calculated signal-to-noise ratio of the received correction reference signal to the first RRU.

Alternatively, an execution body for determining the optional subset may be the second RRU. For example, the first RRU sends a calculated power of the received correction reference signal and the calculated signal-to-noise ratio of the received correction reference signal to the second RRU.

Alternatively, an execution body for determining the optional subset may be another management device. For example, the first RRU sends a calculated power of the received correction reference signal and the calculated signal-to-noise ratio of the received correction reference signal to the management device, and the second RRU sends a calculated power of the received correction reference signal and the calculated signal-to-noise ratio of the received correction reference signal to the management device.

Specifically, a plurality of optional subsets may be determined in S230. In this case, to determine the first transmit power, the first weight vector, the second transmit power, and the second weight vector that are actually used by the first RRU and the second RRU in the embodiment shown in FIG. 5, optionally, FIG. 6 further includes S240 of determining the first optional subset.

The first optional subset that includes the first transmit power, the first weight vector, the second transmit power, and the second weight vector needs to be determined from the plurality of optional subsets.

Optionally, the determining the first optional subset that includes the first transmit power, the first weight vector, the second transmit power, and the second weight vector from the plurality of optional subsets includes the following two steps:

Step 1: Determine a smaller value in values of two signal-to-noise ratios (for example, two signal-to-noise ratios corresponding to one optional subset may be the signal-to-noise ratio 1 and the signal-to-noise ratio 2 in the foregoing embodiment) corresponding to each of the plurality of optional subsets. There are a plurality of smaller values for the plurality of optional subsets.

Step 2: Select an optional subset corresponding to a largest value in the plurality of smaller values. The optional subset may be referred to as the first optional subset, and includes the first transmit power, the first weight vector, the second transmit power, and the second weight vector.

It may be learned from the procedure of determining the first optional subset shown in step 1 and step 2 that a signal-to-noise ratio with a smaller value in the signal-to-noise ratio of the fifth correction reference signal and the signal-to-noise ratio of the sixth correction reference signal that correspond to the first optional subset is a signal-tonoise ratio with a largest value in a plurality of signal-to-noise ratios. Each of the plurality of signal-to-noise ratios is a signal-to-noise ratio with a smaller value in the two signal-to-noise ratios corresponding to each of the plurality of optional subsets.

Optionally, any optional subset may be selected from the plurality of optional subsets as the first optional subset.

In an implementation, if only one optional subset is determined in S230, the optional subset is the first optional subset.

It should be understood that execution of S230 and S240 by the first RRU in FIG. 6 is merely an example, and shall constitute no limitation on the protection scope of this application.

To facilitate understanding of the procedure shown in FIG. 6, the procedure is further described by using a specific example.

It is assumed that the first transmit power set in the first RRU includes two transmit powers (a transmit power #1 and a transmit power #2), the first weight vector set in the first RRU includes two weight vectors (a weight vector #1 and a weight vector #2), and each weight vector includes two elements, which respectively correspond to the first antenna and the second antenna in the first RRU.

The second transmit power set in the second RRU includes two transmit powers (a transmit power #3 and a transmit power #4), the second weight vector set in the second RRU includes two weight vectors (a weight vector #3 and a weight vector #4), and each weight vector includes two elements, which respectively correspond to the third antenna and the fourth antenna in the second RRU.

In this case, the procedure shown in FIG. 6 includes the following steps.

Step 1: The first antenna and the second antenna in the first RRU send a first correction reference signal to the second RRU by using the transmit power #1 and the weight vector #1.

(1) The third antenna and the fourth antenna in the second RRU send a second correction reference signal to the first RRU by using the transmit power #3 and the weight vector #3.

A power of a correction reference signal received by the third antenna in the second RRU is denoted as RSRP #311, a power of a correction reference signal received by the fourth antenna in the second RRU is denoted as RSRP #411, the correction reference signal received by the third antenna and the correction reference signal received by the fourth antenna are combined based on the weight vector #3 to obtain one correction reference signal, and a signal-to-noise ratio of the combined correction reference signal is denoted as an SNR #311.

A power of a correction reference signal received by the first antenna in the first RRU is denoted as RSRP #133, a power of a correction reference signal received by the second antenna in the first RRU is denoted as RSRP #233, the correction reference signal received by the first antenna and the correction reference signal received by the second antenna are combined based on the weight vector #1 to obtain one correction reference signal, and a signal-to-noise ratio of the combined correction reference signal is denoted as an SNR #133.

It is determined whether the RSRP #311, the RSRP #411, the RSRP #133, and the RSRP #233 meet the preset power threshold, and the SNR #311 and the SNR #133 meet the preset signal-to-noise ratio threshold.

If the RSRP #311, the RSRP #411, the RSRP #133, and the RSRP #233 meet the preset power threshold, and the SNR #311 and the SNR #133 meet the preset signal-to-noise ratio threshold, {transmit power #1, weight vector #1, transmit power #3, weight vector #3} is the optional subset.

(2) The third antenna and the fourth antenna in the second RRU send a second correction reference signal to the first RRU by using the transmit power #3 and the weight vector #4.

A power of a correction reference signal received by the third antenna in the second RRU is denoted as RSRP #311, a power of a correction reference signal received by the fourth antenna in the second RRU is denoted as RSRP #411, the correction reference signal received by the third antenna and the correction reference signal received by the fourth antenna are combined based on the weight vector #4 to obtain one correction reference signal, and a signal-to-noise ratio of the combined correction reference signal is denoted as an SNR #411.

A power of a correction reference signal received by the first antenna in the first RRU is denoted as RSRP #134, a power of a correction reference signal received by the second antenna in the first RRU is denoted as RSRP #234, the correction reference signal received by the first antenna and the correction reference signal received by the second antenna are combined based on the weight vector #1 to obtain one correction reference signal, and a signal-to-noise ratio of the combined correction reference signal is denoted as an SNR #134.

It is determined whether the RSRP #311, the RSRP #411, the RSRP #134, and the RSRP #234 meet the preset power threshold, and the SNR #411 and the SNR #134 meet the preset signal-to-noise ratio threshold.

If the RSRP #311, the RSRP #411, the RSRP #134, and the RSRP #234 do not meet the preset power threshold, and the SNR #411 and the SNR #134 do not meet the preset signal-to-noise ratio threshold, {transmit power #1, weight vector #1, transmit power #3, weight vector #4} is not the optional subset.

(3) The third antenna and the fourth antenna in the second RRU send a second correction reference signal to the first RRU by using the transmit power #4 and the weight vector #3.

A power of a correction reference signal received by the third antenna in the second RRU is denoted as RSRP #311, a power of a correction reference signal received by the fourth antenna in the second RRU is denoted as RSRP #411, the correction reference signal received by the third antenna and the correction reference signal received by the fourth antenna are combined based on the weight vector #3 to obtain one correction reference signal, and a signal-to-noise ratio of the combined correction reference signal is denoted as an SNR #311.

A power of a correction reference signal received by the first antenna in the first RRU is denoted as RSRP #143, a power of a correction reference signal received by the second antenna in the first RRU is denoted as RSRP #243, the correction reference signal received by the first antenna and the correction reference signal received by the second antenna are combined based on the weight vector #1 to obtain one correction reference signal, and a signal-to-noise ratio of the combined correction reference signal is denoted as an SNR #143.

It is determined whether the RSRP #311, the RSRP #411, the RSRP #143, and the RSRP #243 meet the preset power threshold, and the SNR #311 and the SNR #143 meet the preset signal-to-noise ratio threshold.

If the RSRP #311, the RSRP #411, the RSRP #143, and the RSRP #243 do not meet the preset power threshold, and the SNR #311 and the SNR #143 do not meet the preset signal-to-noise ratio threshold, {transmit power #1, weight vector #1, transmit power #4, weight vector #3} is not the optional subset.

(4) The third antenna and the fourth antenna in the second RRU send a second correction reference signal to the first RRU by using the transmit power #4 and the weight vector #4.

A power of a correction reference signal received by the third antenna in the second RRU is denoted as RSRP #311, a power of a correction reference signal received by the fourth antenna in the second RRU is denoted as RSRP #411, the correction reference signal received by the third antenna and the correction reference signal received by the fourth antenna are combined based on the weight vector #4 to obtain one correction reference signal, and a signal-to-noise ratio of the combined correction reference signal is denoted as an SNR #411.

A power of a correction reference signal received by the first antenna in the first RRU is denoted as RSRP #144, a power of a correction reference signal received by the second antenna in the first RRU is denoted as RSRP #244, the correction reference signal received by the first antenna and the correction reference signal received by the second antenna are combined based on the weight vector #1 to obtain one correction reference signal, and a signal-to-noise ratio of the combined correction reference signal is denoted as an SNR #144.

It is determined whether the RSRP #311, the RSRP #411, the RSRP #144, and the RSRP #244 meet the preset power threshold, and the SNR #411 and the SNR #144 meet the preset signal-to-noise ratio threshold.

If the RSRP #311, the RSRP #411, the RSRP #144, and the RSRP #244 do not meet the preset power threshold, and the SNR #411 and the SNR #144 do not meet the preset signal-to-noise ratio threshold, (transmit power #1, weight vector #1, transmit power #4, weight vector #4) is not the optional subset.

Step 2: The first antenna and the second antenna in the first RRU send a first correction reference signal to the second RRU by using the transmit power #1 and the weight vector #2.

(1) The third antenna and the fourth antenna in the second RRU send a second correction reference signal to the first RRU by using the transmit power #3 and the weight vector #4.

A power of a correction reference signal received by the third antenna in the second RRU is denoted as RSRP #312, a power of a correction reference signal received by the fourth antenna in the second RRU is denoted as RSRP #412, the correction reference signal received by the third antenna and the correction reference signal received by the fourth antenna are combined based on the weight vector #4 to obtain one correction reference signal, and a signal-to-noise ratio of the combined correction reference signal is denoted as an SNR #412.

A power of a correction reference signal received by the first antenna in the first RRU is denoted as RSRP #134, a power of a correction reference signal received by the second antenna in the first RRU is denoted as RSRP #234, the correction reference signal received by the first antenna and the correction reference signal received by the second antenna are combined based on the weight vector #2 to obtain one correction reference signal, and a signal-to-noise ratio of the combined correction reference signal is denoted as an SNR #234.

It is determined whether the RSRP #312, the RSRP #412, the RSRP #134, and the RSRP #234 meet the preset power threshold, and the SNR #412 and the SNR #234 meet the preset signal-to-noise ratio threshold.

If the RSRP #312, the RSRP #412, the RSRP #134, and the RSRP #234 meet the preset power threshold, and the SNR #412 and the SNR #234 meet the preset signal-to-noise ratio threshold, {transmit power #1, weight vector #2, transmit power #3, weight vector #4} is the optional subset.

(2) The third antenna and the fourth antenna in the second RRU send a second correction reference signal to the first RRU by using the transmit power #3 and the weight vector #3.

A power of a correction reference signal received by the third antenna in the second RRU is denoted as RSRP #312, a power of a correction reference signal received by the fourth antenna in the second RRU is denoted as RSRP #412, the correction reference signal received by the third antenna and the correction reference signal received by the fourth antenna are combined based on the weight vector #3 to obtain one correction reference signal, and a signal-to-noise ratio of the combined correction reference signal is denoted as an SNR #312.

A power of a correction reference signal received by the first antenna in the first RRU is denoted as RSRP #133, a power of a correction reference signal received by the second antenna in the first RRU is denoted as RSRP #233, the correction reference signal received by the first antenna and the correction reference signal received by the second antenna are combined based on the weight vector #2 to obtain one correction reference signal, and a signal-to-noise ratio of the combined correction reference signal is denoted as an SNR #233.

It is determined whether the RSRP #312, the RSRP #412, the RSRP #133, and the RSRP #233 meet the preset power threshold, and the SNR #312 and the SNR #233 meet the preset signal-to-noise ratio threshold.

If the RSRP #312, the RSRP #412, the RSRP #133, and the RSRP #233 do not meet the preset power threshold, and the SNR #312 and the SNR #233 do not meet the preset signal-to-noise ratio threshold, (transmit power #1, weight vector #2, transmit power #3, weight vector #3) is not the optional subset.

(3) The third antenna and the fourth antenna in the second RRU send a second correction reference signal to the first RRU by using the transmit power #4 and the weight vector #3.

A power of a correction reference signal received by the third antenna in the second RRU is denoted as RSRP #312, a power of a correction reference signal received by the fourth antenna in the second RRU is denoted as RSRP #412, the correction reference signal received by the third antenna and the correction reference signal received by the fourth antenna are combined based on the weight vector #3 to obtain one correction reference signal, and a signal-to-noise ratio of the combined correction reference signal is denoted as an SNR #312.

A power of a correction reference signal received by the first antenna in the first RRU is denoted as RSRP #143, a power of a correction reference signal received by the second antenna in the first RRU is denoted as RSRP #243, the correction reference signal received by the first antenna and the correction reference signal received by the second antenna are combined based on the weight vector #2 to obtain one correction reference signal, and a signal-to-noise ratio of the combined correction reference signal is denoted as an SNR #243.

It is determined whether the RSRP #312, the RSRP #412, the RSRP #143, and the RSRP #243 meet the preset power threshold, and the SNR #312 and the SNR #243 meet the preset signal-to-noise ratio threshold.

If the RSRP #312, the RSRP #412, the RSRP #143, and the RSRP #243 do not meet the preset power threshold, and the SNR #312 and the SNR #243 do not meet the preset signal-to-noise ratio threshold, (transmit power #1, weight vector #2, transmit power #4, weight vector #3) is not the optional subset.

(4) The third antenna and the fourth antenna in the second RRU send a second correction reference signal to the first RRU by using the transmit power #4 and the weight vector #4.

A power of a correction reference signal received by the third antenna in the second RRU is denoted as RSRP #312, a power of a correction reference signal received by the fourth antenna in the second RRU is denoted as RSRP #412, the correction reference signal received by the third antenna and the correction reference signal received by the fourth antenna are combined based on the weight vector #4 to obtain one correction reference signal, and a signal-to-noise ratio of the combined correction reference signal is denoted as an SNR #412.

A power of a correction reference signal received by the first antenna in the first RRU is denoted as RSRP #144, a power of a correction reference signal received by the second antenna in the first RRU is denoted as RSRP #244, the correction reference signal received by the first antenna and the correction reference signal received by the second antenna are combined based on the weight vector #2 to obtain one correction reference signal, and a signal-to-noise ratio of the combined correction reference signal is denoted as an SNR #244.

It is determined whether the RSRP #312, the RSRP #412, the RSRP #144, and the RSRP #244 meet the preset power threshold, and the SNR #412 and the SNR #244 meet the preset signal-to-noise ratio threshold.

If the RSRP #312, the RSRP #412, the RSRP #144, and the RSRP #244 do not meet the preset power threshold, and the SNR #244 and the SNR #412 do not meet the preset signal-to-noise ratio threshold, {transmit power #1, weight vector #2, transmit power #4, weight vector #4} is not the optional subset.

Step 3: The first antenna and the second antenna in the first RRU send a first correction reference signal to the second RRU by using the transmit power #2 and the weight vector #1.

(1) The third antenna and the fourth antenna in the second RRU send a second correction reference signal to the first RRU by using the transmit power #4 and the weight vector #3.

A power of a correction reference signal received by the third antenna in the second RRU is denoted as RSRP #321, a power of a correction reference signal received by the fourth antenna in the second RRU is denoted as RSRP #421, the correction reference signal received by the third antenna and the correction reference signal received by the fourth antenna are combined based on the weight vector #3 to obtain one correction reference signal, and a signal-to-noise ratio of the combined correction reference signal is denoted as an SNR #321.

A power of a correction reference signal received by the first antenna in the first RRU is denoted as RSRP #143, a power of a correction reference signal received by the second antenna in the first RRU is denoted as RSRP #243, the correction reference signal received by the first antenna and the correction reference signal received by the second antenna are combined based on the weight vector #1 to obtain one correction reference signal, and a signal-to-noise ratio of the combined correction reference signal is denoted as an SNR #143.

It is determined whether the RSRP #321, the RSRP #421, the RSRP #143, and the RSRP #243 meet the preset power threshold, and the SNR #321 and the SNR #143 meet the preset signal-to-noise ratio threshold.

If the RSRP #321, the RSRP #421, the RSRP #143, and the RSRP #243 meet the preset power threshold, and the SNR #321 and the SNR #143 meet the preset signal-to-noise ratio threshold, {transmit power #2, weight vector #1, transmit power #4, weight vector #3} is the optional subset.

(2) The third antenna and the fourth antenna in the second RRU send a second correction reference signal to the first RRU by using the transmit power #3 and the weight vector #3.

A power of a correction reference signal received by the third antenna in the second RRU is denoted as RSRP #321, a power of a correction reference signal received by the fourth antenna in the second RRU is denoted as RSRP #421, the correction reference signal received by the third antenna and the correction reference signal received by the fourth antenna are combined based on the weight vector #3 to obtain one correction reference signal, and a signal-to-noise ratio of the combined correction reference signal is denoted as an SNR #321.

A power of a correction reference signal received by the first antenna in the first RRU is denoted as RSRP #133, a power of a correction reference signal received by the second antenna in the first RRU is denoted as RSRP #233, the correction reference signal received by the first antenna and the correction reference signal received by the second antenna are combined based on the weight vector #1 to obtain one correction reference signal, and a signal-to-noise ratio of the combined correction reference signal is denoted as an SNR #133.

It is determined whether the RSRP #321, the RSRP #421, the RSRP #133, and the RSRP #233 meet the preset power threshold, and the SNR #321 and the SNR #133 meet the preset signal-to-noise ratio threshold.

If the RSRP #321, the RSRP #421, the RSRP #133, and the RSRP #233 do not meet the preset power threshold, and the SNR #321 and the SNR #133 do not meet the preset signal-to-noise ratio threshold, {transmit power #2, weight vector #1, transmit power #3, weight vector #3} is not the optional subset.

(3) The third antenna and the fourth antenna in the second RRU send a second correction reference signal to the first RRU by using the transmit power #3 and the weight vector #4.

A power of a correction reference signal received by the third antenna in the second RRU is denoted as RSRP #321, a power of a correction reference signal received by the fourth antenna in the second RRU is denoted as RSRP #421, the correction reference signal received by the third antenna and the correction reference signal received by the fourth antenna are combined based on the weight vector #4 to obtain one correction reference signal, and a signal-to-noise ratio of the combined correction reference signal is denoted as an SNR #421.

A power of a correction reference signal received by the first antenna in the first RRU is denoted as RSRP #134, a power of a correction reference signal received by the second antenna in the first RRU is denoted as RSRP #234, the correction reference signal received by the first antenna and the correction reference signal received by the second antenna are combined based on the weight vector #1 to obtain one correction reference signal, and a signal-to-noise ratio of the combined correction reference signal is denoted as an SNR #134.

It is determined whether the RSRP #321, the RSRP #421, the RSRP #134, and the RSRP #234 meet the preset power threshold, and the SNR #421 and the SNR #134 meet the preset signal-to-noise ratio threshold.

If the RSRP #321, the RSRP #421, the RSRP #134, and the RSRP #234 do not meet the preset power threshold, and the SNR #421 and the SNR #134 do not meet the preset signal-to-noise ratio threshold, {transmit power #2, weight vector #1, transmit power #3, weight vector #4} is not the optional subset.

(4) The third antenna and the fourth antenna in the second RRU send a second correction reference signal to the first RRU by using the transmit power #4 and the weight vector #4.

A power of a correction reference signal received by the third antenna in the second RRU is denoted as RSRP #321, a power of a correction reference signal received by the fourth antenna in the second RRU is denoted as RSRP #421, the correction reference signal received by the third antenna and the correction reference signal received by the fourth antenna are combined based on the weight vector #4 to obtain one correction reference signal, and a signal-to-noise ratio of the combined correction reference signal is denoted as an SNR #421.

A power of a correction reference signal received by the first antenna in the first RRU is denoted as RSRP #144, a power of a correction reference signal received by the second antenna in the first RRU is denoted as RSRP #244, the correction reference signal received by the first antenna and the correction reference signal received by the second antenna are combined based on the weight vector #1 to obtain one correction reference signal, and a signal-to-noise ratio of the combined correction reference signal is denoted as an SNR #144.

It is determined whether the RSRP #321, the RSRP #421, the RSRP #144, and the RSRP #244 meet the preset power threshold, and the SNR #421 and the SNR #144 meet the preset signal-to-noise ratio threshold.

If the RSRP #321, the RSRP #421, the RSRP #144, and the RSRP #244 do not meet the preset power threshold, and the SNR #421 and the SNR #144 do not meet the preset signal-to-noise ratio threshold, (transmit power #2, weight vector #1, transmit power #4, weight vector #4) is not the optional subset.

Step 4: The first antenna and the second antenna in the first RRU send a first correction reference signal to the second RRU by using the transmit power #2 and the weight vector #2.

(1) The third antenna and the fourth antenna in the second RRU send a second correction reference signal to the first RRU by using the transmit power #4 and the weight vector #4.

A power of a correction reference signal received by the third antenna in the second RRU is denoted as RSRP #322, a power of a correction reference signal received by the fourth antenna in the second RRU is denoted as RSRP #422, the correction reference signal received by the third antenna and the correction reference signal received by the fourth antenna are combined based on the weight vector #4 to obtain one correction reference signal, and a signal-to-noise ratio of the combined correction reference signal is denoted as an SNR #422.

A power of a correction reference signal received by the first antenna in the first RRU is denoted as RSRP #144, a power of a correction reference signal received by the second antenna in the first RRU is denoted as RSRP #244, the correction reference signal received by the first antenna and the correction reference signal received by the second antenna are combined based on the weight vector #2 to obtain one correction reference signal, and a signal-to-noise ratio of the combined correction reference signal is denoted as an SNR #244.

It is determined whether the RSRP #322, the RSRP #422, the RSRP #144, and the RSRP #244 meet the preset power threshold, and the SNR #422 and the SNR #244 meet the preset signal-to-noise ratio threshold.

If the RSRP #322, the RSRP #422, the RSRP #144, and the RSRP #244 meet the preset power threshold, and the SNR #422 and the SNR #244 meet the preset signal-to-noise ratio threshold, {transmit power #2, weight vector #2, transmit power #4, weight vector #4} is the optional subset.

(2) The third antenna and the fourth antenna in the second RRU send a second correction reference signal to the first RRU by using the transmit power #3 and the weight vector #3.

A power of a correction reference signal received by the third antenna in the second RRU is denoted as RSRP #322, a power of a correction reference signal received by the fourth antenna in the second RRU is denoted as RSRP #422, the correction reference signal received by the third antenna and the correction reference signal received by the fourth antenna are combined based on the weight vector #3 to obtain one correction reference signal, and a signal-to-noise ratio of the combined correction reference signal is denoted as an SNR #322.

A power of a correction reference signal received by the first antenna in the first RRU is denoted as RSRP #133, a power of a correction reference signal received by the second antenna in the first RRU is denoted as RSRP #233, the correction reference signal received by the first antenna and the correction reference signal received by the second antenna are combined based on the weight vector #2 to obtain one correction reference signal, and a signal-to-noise ratio of the combined correction reference signal is denoted as an SNR #233.

It is determined whether the RSRP #322, the RSRP #422, the RSRP #133, and the RSRP #233 meet the preset power threshold, and the SNR #322 and the SNR #233 meet the preset signal-to-noise ratio threshold.

If the RSRP #322, the RSRP #422, the RSRP #133, and the RSRP #233 do not meet the preset power threshold, and the SNR #322 and the SNR #233 do not meet the preset signal-to-noise ratio threshold, {transmit power #2, weight vector #2, transmit power #3, weight vector #3} is not the optional subset.

(3) The third antenna and the fourth antenna in the second RRU send a second correction reference signal to the first RRU by using the transmit power #3 and the weight vector #4.

A power of a correction reference signal received by the third antenna in the second RRU is denoted as RSRP #322, a power of a correction reference signal received by the fourth antenna in the second RRU is denoted as RSRP #422, the correction reference signal received by the third antenna and the correction reference signal received by the fourth antenna are combined based on the weight vector #4 to obtain one correction reference signal, and a signal-to-noise ratio of the combined correction reference signal is denoted as an SNR #422.

A power of a correction reference signal received by the first antenna in the first RRU is denoted as RSRP #134, a power of a correction reference signal received by the second antenna in the first RRU is denoted as RSRP #234, the correction reference signal received by the first antenna and the correction reference signal received by the second antenna are combined based on the weight vector #2 to obtain one correction reference signal, and a signal-to-noise ratio of the combined correction reference signal is denoted as SNR #234.

It is determined whether the RSRP #322, the RSRP #422, the RSRP #134, and the RSRP #234 meet the preset power threshold, and the SNR #422 and the SNR #234 meet the preset signal-to-noise ratio threshold.

If the RSRP #322, the RSRP #422, the RSRP #134, and the RSRP #234 do not meet the preset power threshold, and the SNR #422 and the SNR #234 do not meet the preset signal-to-noise ratio threshold, (transmit power #2, weight vector #2, transmit power #3, weight vector #4) is not the optional subset.

(4) The third antenna and the fourth antenna in the second RRU send a second correction reference signal to the first RRU by using the transmit power #4 and the weight vector #3.

A power of a correction reference signal received by the third antenna in the second RRU is denoted as RSRP #322, a power of a correction reference signal received by the fourth antenna in the second RRU is denoted as RSRP #422, the correction reference signal received by the third antenna and the correction reference signal received by the fourth antenna are combined based on the weight vector #3 to obtain one correction reference signal, and a signal-to-noise ratio of the combined correction reference signal is denoted as an SNR #322.

A power of a correction reference signal received by the first antenna in the first RRU is denoted as RSRP #143, a power of a correction reference signal received by the second antenna in the first RRU is denoted as RSRP #243, the correction reference signal received by the first antenna and the correction reference signal received by the second antenna are combined based on the weight vector #2 to obtain one correction reference signal, and a signal-to-noise ratio of the combined correction reference signal is denoted as an SNR #243.

It is determined whether the RSRP #322, the RSRP #422, the RSRP #143, and the RSRP #243 meet the preset power threshold, and the SNR #322 and the SNR #243 meet the preset signal-to-noise ratio threshold.

If the RSRP #322, the RSRP #422, the RSRP #143, and the RSRP #243 do not meet the preset power threshold, and the SNR #322 and the SNR #243 do not meet the preset signal-to-noise ratio threshold, {transmit power #2, weight vector #2, transmit power #4, weight vector #3} is not the optional subset.

It should be understood that in the specific example, each of the transmit power set and the weight vector set in each of the first RRU and the second RRU includes two elements. That is, there are a total of 16 possible combinations to be used to send the correction reference signals to each other by using different transmit powers and weight vectors: {transmit power of the first RRU, weight vector of the first RRU, transmit power of the second RRU, weight vector of the second RRU}. The 16 possible combinations are referred to as 16 subsets.

It may be learned from the foregoing description that whether a subset is the optional subset is determined by determining, when the first RRU sends the correction reference signal to the second RRU by using a transmit power of the first RRU and a weight vector of the first RRU in each subset, whether a power of a correction reference signal received by each antenna in the second RRU meets the preset power threshold, and whether a signal-to-noise ratio of a correction reference signal obtained after correction reference signals received by all the antennas in the second RRU are combined based on the weight vector of the second RRU meets the preset signal-to-noise ratio threshold and by determining, when the second RRU sends the correction reference signal to the first RRU by using a transmit power of the second RRU and a weight vector of the second RRU in each subset, whether a power of a correction reference signal received by each antenna in the first RRU meets the preset power threshold, and whether a signal-to-noise ratio of a correction reference signal obtained after correction reference signals received by all the antennas in the first RRU are combined based on the weight vector of the first RRU meets the preset signal-to-noise ratio threshold. How to obtain the six measurement values corresponding to each subset is briefly described below.

Case 1:

The six measurement values corresponding to each subset are measured separately.

For example, for the RSRP #311, the RSRP #411, the RSRP #133, the RSRP #233, the SNR #311, and the SNR #133 corresponding to the subset {transmit power #1, weight vector #1, transmit power #3, weight vector #3} and the RSRP #311, the RSRP #411, the RSRP #134, the RSRP #234, the SNR #411, and the SNR #134 corresponding to the subset {transmit power #1, weight vector #1, transmit power #3, weight vector #4}, the SNR #311 and the SNR #411 are respectively calculated when the second RRU transmits the correction reference signal to the first RRU by using the transmit power #3 and the weight vector #3 and the transmit power #3 and the weight vector #4.

Case 2:

An RRU that receives the correction reference signal traverses all weight vectors of the RRU to obtain different signal-to-noise ratios of the correction reference signal through calculation. A plurality of obtained signal-to-noise ratios respectively correspond to different subsets, and are used to determine whether the corresponding subsets are optional subsets.

For example, after the third antenna and the fourth antenna in the second RRU receive the first correction reference signal sent by the first RRU by using the transmit power #1 and the weight vector #1, the SNR #311 and the SNR #411 may be calculated by traversing the weight vector #3 and the weight vector #4. In other words, for each of the subsets {transmit power #1, weight vector #1, transmit power #3, weight vector #3}, {transmit power #1, weight vector #1, transmit power #3, weight vector #4}, {transmit power #1, weight vector #1, transmit power #4, weight vector #3}, and {transmit power #1, weight vector #1, transmit power #4, weight vector #4}, there is no need to calculate the signal-to-noise ratio of the combined correction reference signal.

In conclusion, a measurement manner of determining the six measurement values of the optional subset may be that measurement values corresponding to all the subsets are sequentially measured or that after receiving the correction reference signal, the receive end traverses weight vectors of the receive end to obtain signal-to-noise ratios respectively corresponding to a plurality of subsets through calculation.

It is assumed that in the specific example, the following four optional subsets are obtained:

{transmit power #1, weight vector #1, transmit power #3, weight vector #3}, {transmit power #1, weight vector #2, transmit power #3, weight vector #4}, {transmit power #2, weight vector #1, transmit power #4, weight vector #3}, and {transmit power #2, weight vector #2, transmit power #4, weight vector #4}. Determining the first optional subset from the four optional subsets includes the following two steps;

Step 1: Determine a Smaller Value in Two Signal-to-Noise Ratios Corresponding to Each of the Four Optional Subsets.

For example, the SNR #311=1 and the SNR #133=2; the SNR #412=3 and the SNR #234=4; the SNR #331=5 and the SNR #143=6; and the SNR #422=7 and the SNR #244=8. In this case, smallest values determined from the two signal-to-noise ratios corresponding to each of the four optional subsets include 1, 3, 5, and 7.

Step 2: Select an Optional Subset Corresponding to a Largest Value in the Smallest Values as the First Optional Subset.

For example, "7" is determined from 1, 3, 5, and 7, and a corresponding optional subset is {transmit power #2, weight vector #2, transmit power #4, weight vector #4}. In this case, the first optional subset is {transmit power #2, weight vector #2, transmit power #4, weight vector #4}.

It should be understood that when there are a plurality of largest values in the plurality of smallest values, an optional subset corresponding to any one of the plurality of largest values is selected as the first optional subset. Details are not described herein.

For example, after the plurality of optional subsets are determined, any optional subset may be determined from the plurality of optional subsets as the first optional subset, without performing step 1 and step 2.

It should be understood that in FIG. 6, that the first RRU determines the optional subset is merely used as an example to describe how the first RRU determines the optional subset. In an actual processing process, the execution body for determining the optional subset may be the second RRU, the BBU connected to the first RRU, a BBU connected to the second RRU, or another management device. This is not limited in this application. It only needs to be determined that regardless of the execution body, the first transmit power and the first weight vector in the optional subset that is finally calculated need to be notified to the first RRU, and the second transmit power and the second weight vector need to be notified to the second RRU.

The procedure of the channel correction method according to the embodiments of this application is described in detail above with reference to FIG. 5 and FIG. 6. To determine the first transmit power, the first weight vector, the second transmit power, and the second weight vector, all elements in the first transmit power set, the first weight vector set, the second transmit power set, and the second weight vector set may be traversed to obtain the optional subset that includes the first transmit power, the first weight vector, the second transmit power, and the second weight vector.

In an actual application process, the optional subset may be obtained without traversing all the elements. How another channel correction method according to the embodiments of this application is applied in an actual application process is described below in detail with reference to FIG. 7 to FIG. 9. In the method, the optional subset may be obtained without traversing all the elements.

Figure 7:
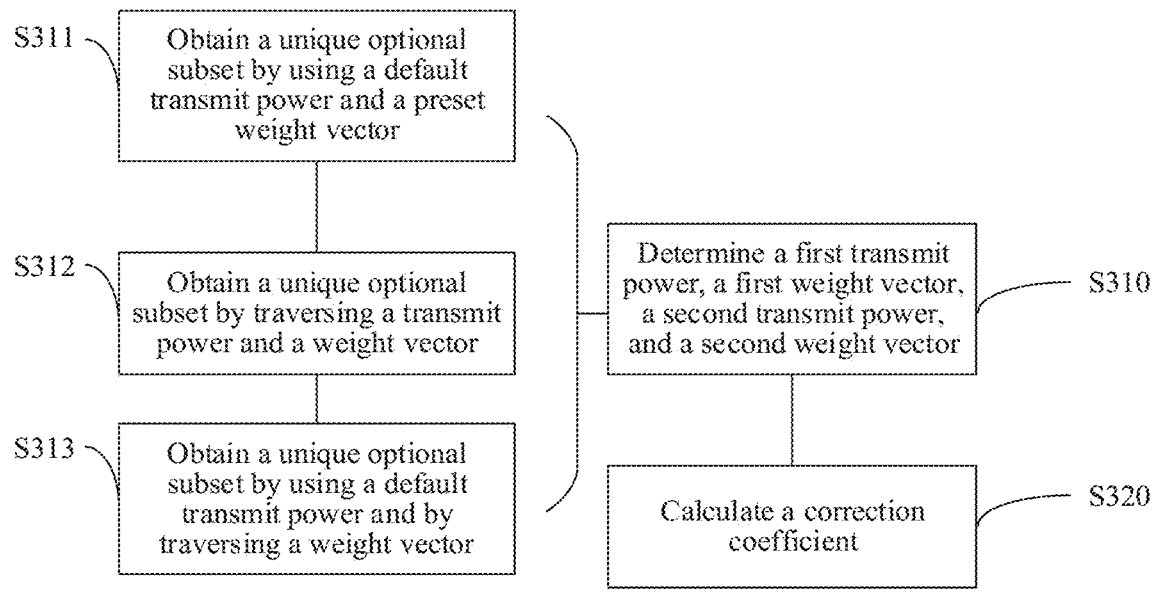
FIG. 7 is an application flowchart of a channel correction method according to an embodiment of this application.

FIG. 7 is an application flowchart of a channel correction method according to an embodiment of this application. The method is applied to correct transmit/receive channels between N RRUs. An RRU i and an RRU j are used as an example to describe how to transmit/receive channels between any two of the N RRUs, where i and j are numbers of different RRUs in the N RRUs, and j≠i.

It should be understood that the RRU i includes the foregoing first transmit power set and first weight vector set, and the RRU j includes the foregoing second transmit power set and second weight vector set.

S310. Determine a first transmit power, a first weight vector, a second transmit power, and a second weight vector.

Specifically, S310 includes the following three phases. The three phases may be understood as a specific implementation of S230 and S240 in the method procedure shown in FIG. 6. In FIG. 6, a condition that needs to be met by a potential optional subset to become an optional subset is briefly described. In the three phases in S310, how to select two transmit powers and two weight vectors from the first transmit power set, the first weight vector set, the second transmit power set, and the second weight vector set to form the potential optional subset in an actual application procedure is described in detail, and whether the potential optional subset that is formed meets the condition of being the optional subset is further determined. When there are a plurality of optional subsets, a first optional subset is selected.

Phase 1: S311. Obtain a unique optional subset by using a default transmit power and a preset weight vector.

An antenna in the RRU i sends a correction reference signal to an antenna in the RRU j by using a first preset transmit power and a first preset weight vector. A weight multiplied by a correction reference signal sent by a $k^{th}$ antenna in the RRU i is a $k^{th}$ element in the first preset weight vector. It is considered by default that the first preset weight vector is a unit vector, in the first weight vector set, in which a $0^{th}$ element is 1 and other elements are 0, and the first preset transmit power is a minimum transmit power in the first transmit power set.

When the antenna in the RRU i sends the correction reference signal to the antenna in the RRU j by using the first preset transmit power and the first preset weight vector, a power of a correction reference signal received by an $l^{th}$ antenna in the RRU j is denoted as $RSRP_{i00,jl}$, and the RRU j combines correction reference signals received by all antennas into one correction reference signal based on a second preset weight vector. A signal-to-noise ratio of the correction reference signal is denoted as $SNR_{i00,j0}$, and a weight on the $l^{th}$ antenna is an $l^{th}$ element in the second preset weight vector. It is considered by default that the second preset weight vector represents a unit vector in which a $0^{th}$ element is 1 and other elements are 0.

The antenna in the RRU j sends a correction reference signal to the antenna in the RRU i by using a second preset transmit power and the second preset weight vector. A weight multiplied by a correction reference signal sent by the $l^{th}$ antenna in the RRU j is an $l^{th}$ element in the second preset weight vector. It is considered by default that the second preset transmit power is a minimum transmit power in the second transmit power set.

When the antenna in the RRU j sends the correction reference signal to the antenna in the RRU i by using the second preset transmit power and the second preset weight vector, a power of a correction reference signal received by the $k^{th}$ antenna in the RRU i is denoted as $RSRP_{j00,ik}$, and the RRU i combines correction reference signals received by all antennas into one correction reference signal based on the first preset weight vector. A signal-to-noise ratio of the correction reference signal is denoted as $SNR_{j00,i0}$, and a weight on the $k^{th}$ antenna is the $k^{th}$ element in the first preset weight vector.

If $RSRP_{i00,jl}<Th_{Upper}$, $RSRP_{j00,ik}<Th_{Upper}$, $SNR_{i00,j0}>Th_{Lower}$, and $SNR_{j00,i0}>Th_{Lower}$ are all met, the first transmit power is equal to the first preset transmit power, the first weight vector is equal to the first preset weight vector, the second transmit power is equal to the second preset transmit power, and the second weight vector is equal to the second preset weight vector, where $Th_{Upper}$ represents an upper limit of a power of a received correction reference signal, for example, $Th_{Upper}$ is a threshold for enabling AAGC at a receive end, $Th_{Lower}$ represents a lower limit of a signal-to-noise ratio of the received correction reference signal, $I=b_j$, and $k=a_i$, and S320 is performed. Otherwise, a phase 2 is entered.

It should be understood that if it is determined in the phase 1 that the optional subset includes the first transmit power, the first weight vector, the second transmit power, and the second weight vector, it is equivalent to that a $0^{th}$ antenna in the RRU i sends a correction reference signal to a $0^{th}$ antenna in the RRU j by using the default transmit power, and the $0^{th}$ antenna in the RRU j sends a correction reference signal to the $0^{th}$ antenna in the RRU i by using the default transmit power.

Phase 2: S312. Obtain a unique optional subset by traversing a transmit power and a weight vector.

An antenna in the RRU i sends a correction reference signal to an antenna in the RRU j by using a power $P_{im}=P_{i,min}+\Delta \cdot m$ dBm and a weight vector $w_{ib}$, and a weight multiplied by a correction reference signal sent by a $k^{th}$ antenna in the RRU i is a $k_{th}$ element in $w_{ib}$, where m=0, 1, . . . , and $L_i$−1, b=1, 2, . . . , and $B_i$, $L_i$ is a quantity of transmit powers in the first transmit power set, $B_i$ is a quantity of weight vectors to be traversed by the RRU i in the phase 2, $P_{i,min}$ is the first preset transmit power in the phase 1, and it is considered by default that $\Delta=10$. In the phase 2, the $L_i$ transmit power values and the $B_i$ weight vectors are traversed by using any combination of time division, frequency division (comb division), and code division. Typically, a $0^{th}$ transmit power value is first used to traverse the $B_i$ weight vectors, then a first transmit power value is used to traverse the $B_i$ weight vectors, and so on. Different transmit power values may be traversed through time division, and different weight vectors may be traversed through time division, frequency division (comb division), or code division.

For example, the weight vector $w_{ib}$ may be designed as a vector in which values of some or all elements are 1, a vector based on discrete Fourier transform (DFT), or a combination thereof. The vector in which values of some or all elements are 1 means that $w_{ib}$ is a vector in which some or all elements are 1 and other elements are 0.

For example, $w_{ib}$ represents a vector in which first $b\Delta_b$ elements are 1 and other elements are 0, and it is considered by default that $\Delta_b=8$. The vector based on discrete Fourier transform means that $w_{ib}$ is generated by using a DFT sequence. A DFT sequence (row vector) whose beam number is p and length is K may be represented as $w_{DFT}(p, K)$, and a $k^{th}$ element of $w_{DFT}(p, K)$ is $$\frac{1}{\sqrt{K}}\exp\left(\frac{-j2\pi pk}{K}\right),$$

where j represents an imaginary unit, and k=0, 1, . . . , and K−1. It is assumed that an antenna form of the RRU i is a dual-polarized antenna array that includes $K_{horizontal}$ subarrays in a horizontal direction and includes $K_{vertical}$ subarrays in a vertical direction, and there are a total of $2K_{horizontal}K_{vertical}$ subarrays. Antennas are horizontally numbered, vertically numbered, and then numbered through polarization. In this case, $w_{ib}=(w_{DFT}(p_{ib}, K_{vertical})\otimes w_{DFT}(q_{ib}, K_{horizontal}), w_{DFT}(p_{ib}, K_{vertical})\otimes w_{DFT}(q_{ib}, K_{horizontal}))$, where $p_{ib}$ represents a traversal beam number in the vertical direction, $q_{ib}$ represents a traversal beam number in the horizontal direction, and the symbol $\otimes$ represents a matrix Kronecker product. For the vector based on discrete Fourier transform, one traversal beam number pair $p_{ib}$ and $q_{ib}$ uniquely determines one weight vector. Typically, $p_{ib}$ is a fixed value (it is considered by default that $p_{ib}=0$), and $q_{ib}=b\Delta_b$ (it is considered by default that $\Delta_b=4$).

When the antenna in the RRU i sends the correction reference signal to the antenna in the RRU j by using the $m^{th}$ transmit power value and the $b^{th}$ weight vector, a power of a correction reference signal received by an $l^{th}$ antenna in the RRU j is denoted as $RSRP_{imb,jl}$, and the RRU j combines correction reference signals received by all antennas into one correction reference signal based on a weight vector $w_{jd}$. A signal-to-noise ratio of the correction reference signal is denoted as $SNR_{imb,jd}$, and a weight on the $l^{th}$ antenna is an $l^{th}$ element in $w_{jd}$. Design of the weight vector $w_{jd}$ is the same as that of $w_{ib}$, and a vector in which values of some or all elements are 1, a vector based on discrete Fourier transform, or a combination thereof may be used.

It should be understood that the RRU j combines correction reference signals received by all antennas into one correction reference signal based on a weight vector $w_{jd}$ is merely an example to facilitate subsequent description that the RRU j sends the correction reference signal based on the weight vector $w_{jd}$, and cannot not be explained as that when the antenna in the RRU i sends the correction reference signal to the antenna in the RRU j by using the $m^{th}$ transmit power value and the $b^{th}$ weight vector, the RRU j can combine the correction reference signals received by all the antennas into one correction reference signal based on only the weight vector $w_{jd}$, but should be understood as that for the correction reference signals received by all the antennas, the RRU j may traverse each weight vector in the RRU j, to obtain a plurality of correction reference signals through combination based on each weight vector, and calculate a signal-to-noise ratio of each of the plurality of correction reference signals.

The antenna in the RRU j sends a correction reference signal to the antenna in the RRU i by using a power $P_{jn}=P_{j,min}+\Delta \cdot n$ dBm and the weight vector $w_{jd}$, and a weight multiplied by a correction reference signal sent by the $l^{th}$ antenna in the RRU j is the $l^{th}$ element in $w_{jd}$, where n=0, 1, . . . , and $L_j$−1, d=1, 1, . . . , and $B_j$, $L_j$ is a quantity of transmit powers in the second transmit power set, $B_j$ is a quantity of weight vectors to be traversed by the RRU j in the phase 2, $P_{j,min}$ is the second preset transmit power in the phase 1, and it is considered by default that $\Delta=10$. In the phase 2, the $B_j$ weight vectors are traversed by using any combination of time division, frequency division (comb division), and code division.

When the antenna in the RRU j sends the correction reference signal to the antenna in the RRU i by using the $n^{th}$ transmit power value and the $d^{th}$ weight vector, a power of a correction reference signal received by the $k^{th}$ antenna in the RRU i is denoted as $RSRP_{jnd,ik}$, and the RRU i combines correction reference signals received by all antennas into one correction reference signal based on the weight vector $w_{ib}$. A signal-to-noise ratio of the correction reference signal is denoted as $SNR_{jnd,ib}$, and a weight on the $k^{th}$ antenna is the $k^{th}$ element in $w_{ib}$.

It should be understood that the RRU i combines correction reference signals received by all antennas into one correction reference signal based on the weight vector $w_{ib}$ is merely an example, and cannot not be explained as that when the antenna in the RRU j sends the correction reference signal to the antenna in the RRU i by using the $n^{th}$ transmit power value and the $d^{th}$ weight vector, the RRU i can combine the correction reference signals received by all the antennas into one correction reference signal based on only the weight vector $w_{ib}$, but should be understood as that for the correction reference signals received by all the antennas, the RRU i may traverse each weight vector in the RRU i, to obtain a plurality of correction reference signals through combination based on each weight vector, and calculate a signal-to-noise ratio of each of the plurality of correction reference signals.

Transmit powers and weight vectors $\{P_{im}, w_{ib}, P_{jn}, w_{jd}\}$ that meet the following four formulas, namely, $RSRP_{imb,jl} < Th_{Upper}$, $RSRP_{jnd,ik} < Th_{Upper}$, $SNR_{imb,jd} > Th_{Lower}$, and $SNR_{jnd,ib} > Th_{Lower}$, form an optional subset $C_{imb,jnd}$, where meanings of $Th_{Upper}$ and $Th_{Lower}$ are the same as those in the phase 1, 1 is a sequence number of a non-zero element in $w_{jd}$, and k is a sequence number of a non-zero element in $w_{ib}$. If there is no optional subset, a phase 3 is entered. If there is the optional subset, an optional subset that enables a smallest value in $SNR_{imb,jd}$ and $SNR_{jnd,ib}$ to be a largest value is selected from all optional subsets (if there are a plurality of same largest values, any one is selected), is denoted as $C_{im*b*,jn*d*}$, and is expressed by a formula $C_{im*b*,jn*d*} = \arg\max\{\min\{SNR_{imb,jb}, SNR_{jnd,ib}\}\}$. In this case, the first transmit power, the first weight vector, the second transmit power, and the second weight vector are an optional subset $\{P_{im*}, w_{ib*}, P_{jn*}, w_{jd*}\}$, and S320 is performed.

Phase 3: S313. Obtain a unique optional subset by using a default transmit power and by traversing a weight vector.

An antenna in the RRU i sends a correction reference signal to an antenna in the RRU j by using a power $P_{i0} = P_{i,min}$ dBm and a weight vector $v_{ib}$, and a weight multiplied by a correction reference signal sent by a $k^{th}$ antenna in the RRU i is a $k^{th}$ element in $v_{ib}$, where $b = B_i+1, B_i+2, \ldots,$ and $B_i+\tilde{B}_i$, $\tilde{B}_i$ is a quantity of weight vectors to be traversed by the RRU i in the phase 3, and $P_{i,min}$ is the first preset transmit power in the phase 1.

For example, the weight vector $v_{ib}$ may be designed as follows: A value of an $f_i^{th}$ element of $v_{ib}$ is $$\frac{1}{\sqrt{2}},$$

value of a $g_i^{th}$ element of $v_{ib}$ is $$\frac{1}{\sqrt{2}} \exp\left(\frac{j2\pi(b - B_i)}{\tilde{B}_i}\right),$$

and values of all other elements are 0. An $f_i^{th}$ antenna and a $g_i^{th}$ antenna are two most adjacent antennas in a same horizontal polarization direction in the RRU i.

When the antenna in the RRU i sends the correction reference signal to the antenna in the RRU j by using the $0^{th}$ transmit power value and the $b^{th}$ weight vector, a power of a correction reference signal received by an $l^{th}$ antenna in the RRU j is denoted as $RSRP_{i0b,jl}$, and the RRU j combines correction reference signals received by all antennas into one correction reference signal based on a weight vector $v_{jd}$. A signal-to-noise ratio of the correction reference signal is denoted as $SNR_{i0b,jd}$, and a weight on the $l^{th}$ antenna is an $l^{th}$ element in $v_{jd}$. Design of $v_{jd}$ is the same as that of $v_{ib}$.

The antenna in the RRU j sends a correction reference signal to the antenna in the RRU i by using a power $P_{j0} = P_{j,min}$ dBm and the weight vector $v_{jd}$, and a weight multiplied by a correction reference signal sent by the $l^{th}$ antenna in the RRU j is the $l^{th}$ element in $v_{jd}$, where $d = B_j+1, B_j+2, \ldots,$ and $B_j+\tilde{B}_j$, $\tilde{B}_j$ is a quantity of weight vectors to be traversed by the RRU j in the phase 3, and $P_{j,min}$ is the second preset transmit power in the phase 1.

When the antenna in the RRU j sends the correction reference signal to the antenna in the RRU i by using the $0^{th}$ transmit power value and the $d^{th}$ weight vector, a power of a correction reference signal received by the $k^{th}$ antenna in the RRU i is denoted as $RSRP_{j0d,ik}$, and correction reference signals received by all antennas are combined into one correction reference signal based on the weight vector $w_{ib} = v_{ib}$. A signal-to-noise ratio of the correction reference signal is denoted as $SNR_{j0d,ib}$, and a weight on the $k^{th}$ antenna is the $k^{th}$ element in $v_{ib}$.

Weight vectors $\{v_{ib}, v_{jd}\}$ that meet the following four formulas, namely, $RSRP_{i0b,jl} < Th_{Upper}$, $RSRP_{j0d,ik} < Th_{Upper}$, $SNR_{i0b,jd} > Th_{Lower}$, and $SNR_{j0d,ib} > Th_{Lower}$, form an optional set $C_{ib,jd}$, where meanings of $Th_{Upper}$ and $Th_{Lower}$ are the same as those in the phase 1, 1 is a sequence number of a non-zero element in $w_{jd}$, and k is a sequence number of a non-zero element in $w_{ib}$. If there is no optional subset, the RRU i and the RRU j are not connected, and correction cannot be performed. If there is the optional subset, an optional subset that enables a smallest value in $SNR_{i0b,jd}$ and $SNR_{j0d,ib}$ to be a largest value is selected from all optional sets (if there are a plurality of same largest values, any one is selected), is denoted as $C_{ib*,jd*}$, and is expressed by a formula $C_{ib*,jd*} = \arg\max\{\min\{SNR_{i0b,jd}, SNR_{j0d,ib}\}\}$, where $\min\{a, b\}$ represents a smaller value in the value a and the value b, and $\arg\max\{A\}$ represents an optional subset that enables a value of the expression A in curly brackets to be a largest value. In this case, the first transmit power, the first weight vector, the second transmit power, and the second weight vector are $\{P_{i,min}, w_{ib*}, P_{j,min}, w_{jd*}\}$.

S320. Calculate a correction coefficient.

For ease of description, in this case, the first preset transmit power is referred to as $P_{im*}$ dBm, the first preset weight vector is referred to as $w_{ib*}$, the second preset transmit power is referred to as $P_{jn*}$ dBm, and the second preset weight vector is referred to as $w_{jd*}$.

The antenna in the RRU i sends a correction reference signal to the antenna in the RRU j by using the power $P_{im*}$ dBm and the weight vector $w_{ib*}$. A weight multiplied by a correction reference signal sent by the $k^{th}$ antenna in the RRU i is a $k^{th}$ element in $w_{ib*}$. All the antennas in the RRU j receive the correction reference signal, and all received correction reference signals are combined into one correction reference signal (a signal #1) based on the weight vector $w_{jd*}$. A weight on the $l^{th}$ antenna in the RRU j is an $l^{th}$ element in $w_{jd*}$.

The antenna in the RRU j sends a correction reference signal to the antenna in the RRU i by using the power $P_{jn*}$ dBm and the weight vector $w_{jd*}$. A weight multiplied by a correction reference signal sent by the $l^{th}$ antenna in the RRU j is the $l^{th}$ element in $w_{jd*}$. All the antennas in the RRU i receive the correction reference signal, and all received correction reference signals are combined into one correction reference signal (a signal #2) based on the weight vector $w_{ib*}$. A weight on the $k^{th}$ antenna in the RRU i is the $k^{th}$ element in $w_{ib*}$.

Finally, the correction coefficient is calculated based on the signal #1 and the signal #2.

In the application procedure shown in FIG. 7, in the phase 1, the minimum transmit power and a single antenna are used to transmit and receive the correction reference signal, to determine whether a correction requirement is met. In phase 2, both the transmit power and the weight vector are traversed. In this case, the weight vector is designed to increase a power of the received correction reference signal. In phase 3, the minimum transmit power is used, that is, no transmit power is traversed, and only the weight vector is traversed. In this case, the weight vector is designed to reduce a power of the received correction reference signal. In the application procedure shown in FIG. 7, a two-dimensional traversal of the transmit power and the weight vector is performed, and therefore a dynamic range of the receive power of the correction reference signal is significantly enlarged. In this case, a more appropriate receive power of the correction reference signal can be obtained. This embodiment is applicable to a scenario of channel correction between a plurality of cells that include a combination of co-site cells and non-co-site cells, to resolve a problem that correction cannot be performed due to an excessively high or low power of a correction reference signal.

In comparison with the technical solution in the embodiment in FIG. 3, in the application procedure shown in FIG. 7, the power of the received correction reference signal may be increased or reduced by using the weight vector, to resolve the problem that correction cannot be performed due to an excessively high or low power of a correction reference signal. In comparison with the technical solution in the embodiment in FIG. 4, in the application procedure shown in FIG. 7, the power of the received correction reference signal may be reduced by using the weight vector, to resolve a problem of an excessively high power of a correction reference signal. Both the RRUs use the weight, and therefore a higher power of the correction reference signal can be provided. In addition, time overheads required for calculating a dynamic weight can be saved by using the weight.

Figure 8:
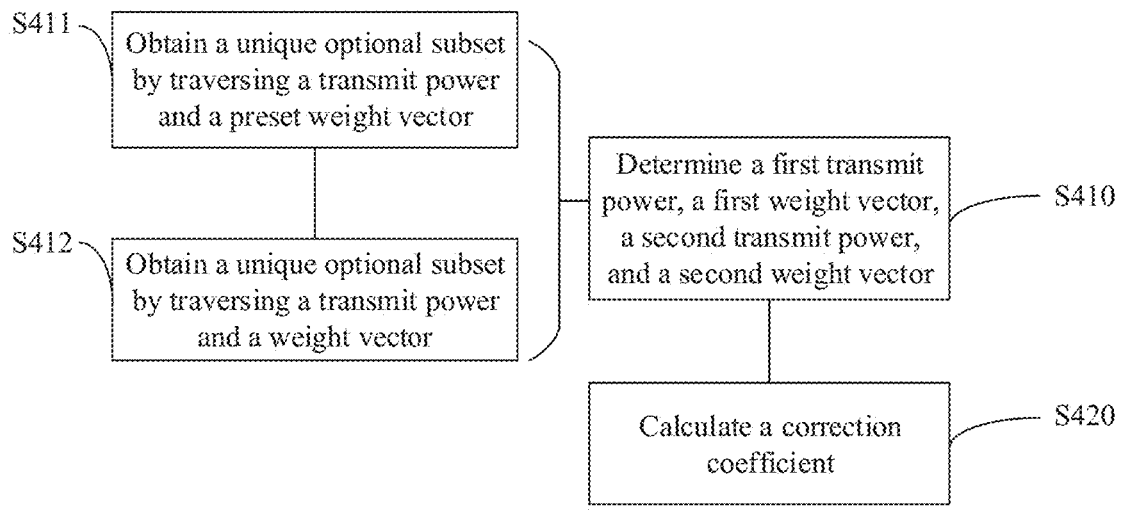
FIG. 8 is another application flowchart of a channel correction method according to an embodiment of this application.

FIG. 8 is another application flowchart of a channel correction method according to an embodiment of this application. The method is applied to correct transmit/receive channels between N RRUs. An RRU i and an RRU j are used as an example for description, where i and j are numbers of different RRUs in the N RRUs, and j≠i.

It should be understood that the RRU i includes the foregoing first transmit power set and first weight vector set, and the RRU j includes the foregoing second transmit power set and second weight vector set.

S410. Determine a first transmit power, a first weight vector, a second transmit power, and a second weight vector.

Specifically, S410 includes the following two phases.

Phase 1: S411. Obtain a unique optional subset by traversing a transmit power and a preset weight vector.

An antenna in the RRU i sends a correction reference signal to an antenna in the RRU j by using a power $P_{im}=P_{i,min}+\Delta \cdot m$ dBm and a first preset weight vector, and a weight multiplied by a correction reference signal sent by a $k^{th}$ antenna in the RRU i is a $k^{th}$ element in the first preset weight vector, where m=0, 1, . . . , and $L_i$−1, $L_i$ is a quantity of transmit powers in the first transmit power set, and it is considered by default that Δ=10. The first preset weight vector is a unit vector, in the first weight vector set, in which a $0^{th}$ element is 1 and other elements are 0.

When the antenna in the RRU i sends the correction reference signal to the antenna in the RRU j by using the power $P_{im}=P_{i,min}+\Delta \cdot m$ dBm and the first preset weight vector, a power of a correction reference signal received by an $l^{th}$ antenna in the RRU j is denoted as $RSRP_{im0,jl}$, and the RRU j combines correction reference signals received by all antennas into one correction reference signal based on a second preset weight vector. A signal-to-noise ratio of the correction reference signal is denoted as $SNR_{im0,j0}$, and a weight on the $l^{th}$ antenna is an $l^{th}$ element in the second preset weight vector. It is considered by default that the second preset weight vector is a unit vector in which a $0^{th}$ element is 1 and other elements are 0.

The antenna in the RRU j sends a correction reference signal to the antenna in the RRU i by using a power $P_{jn}=P_{j,min}+\Delta \cdot n$ dBm and the second preset weight vector, and a weight multiplied by a correction reference signal sent by the $l^{th}$ antenna in the RRU j is an $l^{th}$ element in the second preset weight vector, where n=0, 1, . . . , and $L_j$−1, $L_j$ is a quantity of transmit powers in the second transmit power set, and it is considered by default that Δ=10.

When the antenna in the RRU j sends the correction reference signal to the antenna in the RRU i by using the power $P_{jn}=P_{j,min}+\Delta \cdot n$ dBm and the second preset weight vector, a power of a correction reference signal received by the $k^{th}$ antenna in the RRU i is denoted as $RSRP_{jn0,ik}$, and the RRU i combines correction reference signals received by all antennas into one correction reference signal based on the first preset weight vector. A signal-to-noise ratio of the correction reference signal is denoted as $SNR_{jn0,i0}$, and a weight on the $k^{th}$ antenna is the $k^{th}$ element in the first preset weight vector.

Transmit powers $\{P_{im}, P_{jn}\}$ that meet the following four formulas, namely, $RSRP_{im0,jl}<Th_{Upper}$, $RSRP_{jn0,ik}<Th_{Upper}$, $SNR_{im0,j0}>Th_{Lower}$, and $SNR_{jn0,i0}>Th_{Lower}$, form an optional set $C_{im,jn}$, where $Th_{Upper}$ represents an upper limit of a power of a received correction reference signal, $Th_{Lower}$ represents a lower limit of a signal-to-noise ratio of the received correction reference signal, l=$b_j$, and k=$a_i$. If there is no optional subset, a phase 2 is entered. If there is the optional subset, an optional subset that enables a smallest value in $SNR_{im0,j0}$ and $SNR_{jn0,i0}$ to be a largest value is selected from all optional subsets (if there are a plurality of same largest values, any one is selected), is denoted as $C_{im*,jn*}$, and is expressed by a formula $C_{im*,jn*}$=argmax $\{\min\{SNR_{imb,jd}, SNR_{jnd,ib}\}\}$. In this case, the first transmit power, the first weight vector, the second transmit power, and the second weight vector are $\{P_{im*}$, first preset weight vector, $P_{jn*}$, second preset weight vector$\}$, and S420 is performed. Otherwise, phase 2 is entered.

Phase 2: S412. Obtain a unique optional subset by traversing a transmit power and a weight vector.

An antenna in the RRU i sends a correction reference signal to an antenna in the RRU j by using a power $P_{im*}=P_{i,min}+\Delta \cdot m^*$ dBm and a weight vector $w_{ib}$, and a weight multiplied by a correction reference signal sent by a $k^{th}$ antenna in the RRU i is a $k^{th}$ element in $w_{ib}$, where m*=$L_i$−1, b=1, 2, . . . , and $B_i$, $L_i$ is a quantity of transmit powers in the first transmit power set, and $B_i$ is a quantity of weight vectors in the second weight vector set. In the phase 2, the $B_i$ weight vectors are traversed by using any combination of time division, frequency division (comb division), and code division. The weight vector $w_{ib}$ is the same as that in the phase 2 shown in FIG. 6. Details are not described herein.

When the antenna in the RRU i sends the correction reference signal to the antenna in the RRU j by using the $m^{*th}$ transmit power value and the $b^{th}$ weight vector, a power of a correction reference signal received by an $l^{th}$ antenna in the RRU j is denoted as $RSRP_{im*b,jl}$, and the RRU j combines correction reference signals received by all antennas into one correction reference signal based on a weight vector $w_{jd}$. A signal-to-noise ratio of the correction reference signal is denoted as $SNR_{im*b,jd}$, and a weight on the $l^{th}$ antenna is an $l^{th}$ element in $w_{jd}$. Design of the weight vector $w_{jd}$ is the same as that of $w_{ib}$, and a vector in which values of some or all elements are 1, a vector based on discrete Fourier transform, or a combination thereof may be used.

The antenna in the RRU j sends a correction reference signal to the antenna in the RRU i by using a power $P_{jn*}=P_{j,min}+\Delta \cdot n^*$ dBm and the weight vector $w_{jd}$, and a weight multiplied by a correction reference signal sent by the $l^{th}$ antenna in the RRU j is the $l^{th}$ element in $w_{jd}$, where $n^*=L_j-1$, $d=1, 1, \ldots,$ and $B_j$, and $B_j$ is a quantity of weight vectors in the second weight vector set.

When the antenna in the RRU j sends the correction reference signal to the antenna in the RRU i by using the $n^{*th}$ transmit power value and the $d^{th}$ weight vector, a power of a correction reference signal received by the $k^{th}$ antenna in the RRU i is denoted as $RSRP_{jn*d,ik}$, and the RRU i combines correction reference signals received by all antennas into one correction reference signal based on the weight vector $w_{ib}$. A signal-to-noise ratio of the correction reference signal is denoted as $SNR_{jn*d,ib}$, and a weight on the $k^{th}$ antenna is the $k^{th}$ element in $w_{ib}$.

Transmit powers and weight vectors $\{w_{ib}, w_{jd}\}$ that meet the following four formulas, namely, $RSRP_{im*b,jl}<Th_{Upper}$, $RSRP_{jn*d,ik}<Th_{Upper}$, $SNR_{im*b,jd}>Th_{Lower}$, and $SNR_{jn*d,ib}>Th_{Lower}$, form an optional set $C_{ib,jd}$, where meaning of $Th_{Upper}$ and $Th_{Lower}$ are the same as those in the phase 1, l is a sequence number of a non-zero element in $w_{jd}$, and k is a sequence number of a non-zero element in $w_{ib}$. If there is no optional subset, the RRU i and the RRU j are not connected, and correction cannot be performed. If there is the optional subset, an optional subset that enables a smallest value in $SNR_{im*b,jd}$ and $SNR_{jn*d,ib}$ to be a largest value is selected from all optional subsets (if there are a plurality of same largest values, any one is selected), is denoted as $C_{ib*,jd*}$, and is expressed by a formula $C_{ib*,jd*}=\text{argmax} \{\min\{SNR_{im*b,jd}, SNR_{jn*,ib}\}\}$. In this case, the first transmit power, the first weight vector, the second transmit power, and the second weight vector are optional subset $\{P_{im*}, w_{ib*}, w_{jd*}, P_{jn*}\}$, and S420 is performed.

S420. Calculate a correction coefficient.

This is similar to S320 shown in FIG. 7. Details are not described herein.

A main difference between the application procedure shown in FIG. 8 and the application procedure shown in FIG. 7 is as follows:

In a procedure of determining the first transmit power, the first weight vector, the second transmit power, and the second weight vector, the weight vector is used to increase a power of the received correction reference signal, and is not used to reduce the power of the received correction reference signal. The application procedure shown in FIG. 8 is mainly applicable to a scenario of correcting transmit/receive channels between a plurality of non-co-site RRUs.

In the application procedure shown in FIG. 8, a two-dimensional traversal problem of the transmit power and the weight vector is divided into two one-dimensional traversal problems through time division. In the phase 1, both the RRUs use a single antenna to transmit and receive the correction reference signal, that is, no weight vector is traversed, and only the transmit power is traversed. In the phase 2, both the RRUs use a maximum transmit power, that is, no transmit power is traversed, and only the weight vector is traversed. In the phase 1, it is determined whether a correction requirement can be met by using a conventional single antenna solution. If the correction requirement is not met, in the phase 2, the power of the received correction reference signal is significantly increased by using a transmit/receive weight vector. The application procedure shown in FIG. 8 is particularly applicable to a scenario of correcting transmit/receive channels between a plurality of non-co-site RRUs, to resolve a problem that correction cannot be performed due to an excessively low power of a correction reference signal.

In comparison with the technical solution in the embodiment in FIG. 3, in the application procedure shown in FIG. 8, the power of the received correction reference signal can be significantly increased by using the weight vector, to resolve the problem that correction cannot be performed due to an excessively low power of a correction reference signal. In comparison with the technical solution in the embodiment in FIG. 4, in the application procedure shown in FIG. 8, both the RRUs use the weight, and therefore a higher power of the received correction reference signal can be provided. In addition, time overheads and overheads required for calculating a dynamic weight can be saved by using the weight. The weight may be designed as a wide beam, and does not need to be frequently traversed, and therefore time overheads are saved. Furthermore, there is no need to calculate the weight, and therefore there are no calculation overheads.

Figure 9:
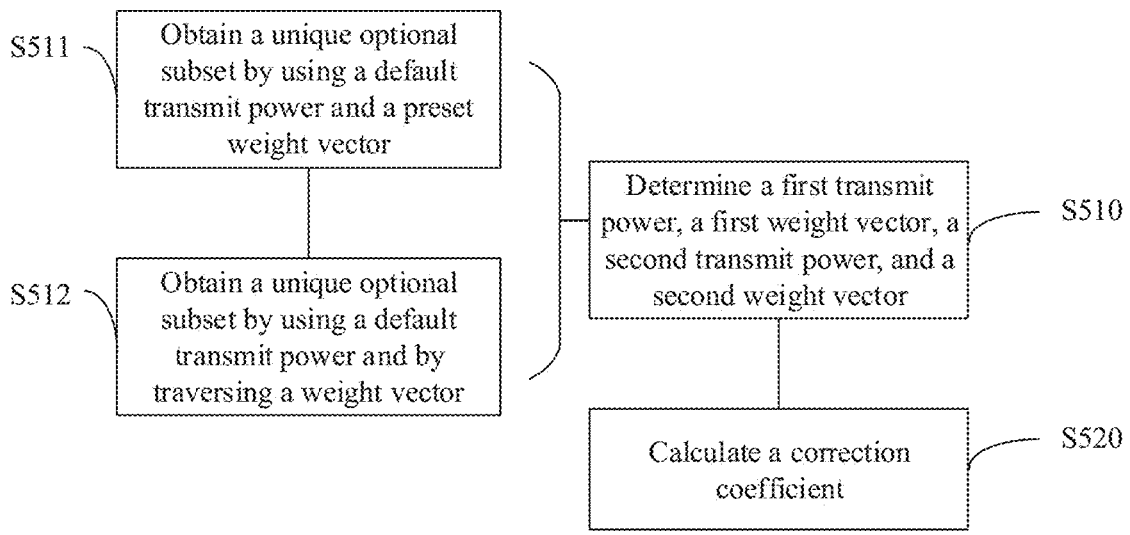
FIG. 9 is still another application flowchart of a channel correction method according to an embodiment of this application.

FIG. 9 is still another application flowchart of a channel correction method according to an embodiment of this application. The method is applied to correct transmit/receive channels between N RRUs. An RRU i and an RRU j are used as an example for description, where i and j are numbers of different RRUs in the N RRUs, and j≠i.

It should be understood that the RRU i includes the foregoing first transmit power set and first weight vector set, and the RRU j includes the foregoing second transmit power set and second weight vector set.

S510. Determine a first transmit power, a first weight vector, a second transmit power, and a second weight vector.

Specifically, S510 includes the following two phases.

Phase 1: S511. Obtain a unique optional subset by using a default transmit power and a preset weight vector.

This is similar to S311 shown in FIG. 7. Details are not described herein.

Phase 2: S512. Obtain a unique optional subset by using a default transmit power and by traversing a weight vector.

An antenna in the RRU i sends a correction reference signal to an antenna in the RRU j by using a power $P_{i0}=P_{i,min}$ dBm and a weight vector $v_{ib}$, and a weight multiplied by a correction reference signal sent by a $k^{th}$ antenna in the RRU i is a $k^{th}$ element in $v_{ib}$, where $b=1, 2, \ldots,$ and $B_i$, $B_i$ is a quantity of weight vectors in the first weight vector set, and $P_{i,min}$ is a first preset transmit power in the phase 1.

For example, design of the weight vector $v_{ib}$ is similar to that of the weight vector $v_{ib}$ in S313 shown in FIG. 6. Details are not described herein.

When the antenna in the RRU i sends the correction reference signal to the antenna in the RRU j by using the $0^{th}$ transmit power value and the $b^{th}$ weight vector, a power of a correction reference signal received by an $l^{th}$ antenna in the RRU j is denoted as $RSRP_{iOb,jl}$, and the RRU j combines correction reference signals received by all antennas into one correction reference signal based on a weight vector $v_{jd}$. A signal-to-noise ratio of the correction reference signal is denoted as $SNR_{iOb,jd}$, and a weight on the $l^{th}$ antenna is an $l^{th}$ element in $v_{jd}$. Design of $v_{jd}$ is the same as that of $v_{ib}$.

The antenna in the RRU j sends a correction reference signal to the antenna in the RRU i by using a power $P_{j0}=P_{j,min}$ dBm and the weight vector $v_{jd}$, and a weight multiplied by a correction reference signal sent by the $l^{th}$ antenna in the RRU j is the $l^{th}$ element in $v_{jd}$, where d=1, 1, ..., and $B_j$, $B_j$ is a quantity of weight vectors in the second weight vector set, and $P_{j,min}$ is a second preset transmit power in the phase 1.

When the antenna in the RRU j sends the correction reference signal to the antenna in the RRU i by using the $0^{th}$ transmit power value and the $d^{th}$ weight vector, a power of a correction reference signal received by the $k^{th}$ antenna in the RRU i is denoted as $RSRP_{j0d,ik}$, and correction reference signals received by all antennas are combined into one correction reference signal based on the weight vector $w_{ib}=v_{ib}$. A signal-to-noise ratio of the correction reference signal is denoted as $SNR_{j0d,ib}$, and a weight on the $k^{th}$ antenna is the $k^{th}$ element in $v_{ib}$.

Weight vectors $\{v_{ib}, v_{jd}\}$ that meet the following four formulas, namely, $RSRP_{iOb,jl}<Th_{Upper}$, $RSRP_{j0d,ik}<Th_{Upper}$, $SNR_{iOb,jd}>Th_{Lower}$, and $SNR_{j0d,ib}>Th_{Lower}$, form an optional set $C_{ib,jd}$, where meanings of $Th_{Upper}$ and $Th_{Lower}$ are the same as those in the phase 1, 1 is a sequence number of a non-zero element in $w_{jd}$, and k is a sequence number of a non-zero element in $w_{ib}$. If there is no optional subset, the RRU i and the RRU j are not connected, and correction cannot be performed. If there is the optional subset, an optional subset that enables a smallest value in $SNR_{iOb,jd}$ and $SNR_{j0d,ib}$ to be a largest value is selected from all optional subsets (if there are a plurality of same largest values, any one is selected), is denoted as $C_{ib*,jd*}$, and is expressed by a formula $C_{ib*,jd*}=\mathrm{argmax}\{\min\{SNR_{iOb,jd}, SNR_{j0d,ib}\}\}$, where min{a, b} represents a smaller value in the value a and the value b, and argmax{A} represents an optional subset that enables a value of the expression A in curly brackets to be a largest value. In this case, the first transmit power, the first weight vector, the second transmit power, and the second weight vector are $\{P_{i,min}, w_{ib*}, P_{j,min}, w_{jd*}\}$, and S520 is performed.

S520. Calculate a correction coefficient.

This is similar to S320 shown in FIG. 7. Details are not described herein.

A main difference between the application procedure shown in FIG. 9 and the application procedure shown in FIG. 7 is as follows:

In a procedure of determining the first transmit power, the first weight vector, the second transmit power, and the second weight vector, the weight vector is used to reduce a power of the received correction reference signal, and is not used to increase the receive power of the correction reference signal. The application procedure shown in FIG. 9 is mainly applicable to a scenario of correcting transmit/receive channels between a plurality of co-site RRUs.

In the application procedure shown in FIG. 9, a two-dimensional traversal problem of the transmit power and the weight vector is divided into two one-dimensional traversal problems through time division. In the phase 1, both the RRUs use a single antenna to transmit and receive the correction reference signal, that is, no weight vector is traversed, and only the transmit power is traversed. In the phase 2, both the RRUs use a minimum transmit power, that is, no transmit power is traversed, and only the weight vector is traversed. In the phase 1, it is determined whether a correction requirement can be met by using a conventional single antenna solution. If the correction requirement is not met, in the phase 2, the power of the received correction reference signal is reduced by using a transmit/receive weight vector. The application procedure shown in FIG. 9 is particularly applicable to a scenario of correcting transmit/receive channels between a plurality of co-site RRUs, to resolve a problem that correction cannot be performed due to an excessively high power of a correction reference signal.

In comparison with the technical solution in the embodiment in FIG. 3, in the application procedure shown in FIG. 9, the power of the received correction reference signal can be significantly increased by using the weight vector, to resolve the problem that correction cannot be performed due to an excessively high power of a correction reference signal. In comparison with the technical solution in the embodiment in FIG. 4, in the application procedure shown in FIG. 9, the power of the received correction reference signal can be reduced. In addition, time overheads required for calculating a dynamic weight can be saved by using the weight.

It should be understood that sequence numbers of the foregoing processes do not mean execution sequences in the embodiments. The execution sequences of the processes should be determined according to functions and internal logic of the processes, and should not be construed as any limitation on the implementation processes of the embodiments of this application.

The channel correction method according to the embodiments of this application and the specific application procedures of the channel correction method are described above in detail with reference to FIG. 5 to FIG. 9. A first RRU and a second RRU according to this application are described below in detail with reference to FIG. 10 to FIG. 13.

Figure 10:
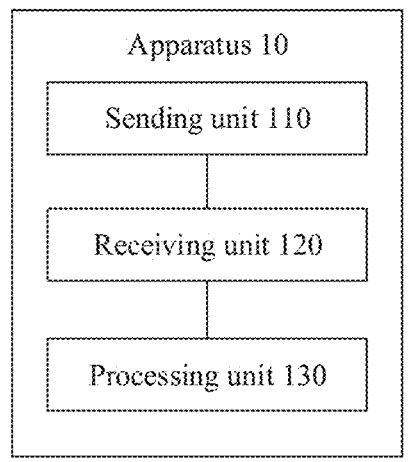
FIG. 10 is a schematic diagram of a first RRU according to an embodiment of this application.

FIG. 10 is a schematic diagram of a first RRU 10 according to an embodiment of this application. As shown in FIG. 10, the first RRU 10 includes a sending unit 110, a receiving unit 120, and a processing unit 130.

The sending unit 110 is configured to send a first correction reference signal to a third antenna and a fourth antenna through a first antenna by using a first transmit power and a first weight vector.

The sending unit 110 is further configured to send a second correction reference signal to the third antenna and the fourth antenna through a second antenna by using the first transmit power and the first weight vector. The first transmit power is a transmit power in a preset first transmit power set, and the first weight vector is a weight vector in a preset first weight vector set.

The receiving unit 120 is configured to receive, through the first antenna and the second antenna, a third correction reference signal sent by a second RRU through the third antenna by using a second transmit power and a second weight vector.

The receiving unit 120 is further configured to receive, through the first antenna and the second antenna, a fourth correction reference signal sent by the second RRU through the fourth antenna by using the second transmit power and the second weight vector. The second transmit power is a transmit power in a preset second transmit power set, and the second weight vector is a weight vector in a preset second weight vector set.

The processing unit 130 is configured to: combine a correction reference signal received by the first antenna and a correction reference signal received by the second antenna into a sixth correction reference signal, and combine a correction reference signal received by the third antenna and a correction reference signal received by the fourth antenna into a fifth correction reference signal. The fifth correction reference signal and the sixth correction reference signal are used to calculate a correction coefficient of transmit/receive channels between the first RRU and the second RRU.

The first RRU 10 exactly corresponds to the first RRU in the method embodiments, and a corresponding unit of the first RRU 10 is configured to perform the corresponding step performed by the first RRU in the method embodiments shown in FIG. 5 to FIG. 9.

The sending unit 110 in the first RRU 10 performs the step of sending by the first RRU in the method embodiments, for example, performs step 110 of sending a first correction reference signal and a second correction reference signal to the second RRU in FIG. 5. The receiving unit 120 performs the step of receiving by the first RRU in the method embodiments, for example, performs step 130 of receiving a third correction reference signal and a fourth correction reference signal in FIG. 5. The processing unit 130 performs the step implemented or processed in the first RRU in the method embodiments, for example, performs step 140 of obtaining the sixth correction reference signal in FIG. 5.

Optionally, the receiving unit 120 and the sending unit 110 may form a transceiver unit, which has both a receiving function and a sending function. The processing unit 130 may be a processor. The sending unit 110 may be a transmitter. The receiving unit 120 may be a receiver. The receiver and the transmitter may be integrated into a transceiver.

Figure 11:
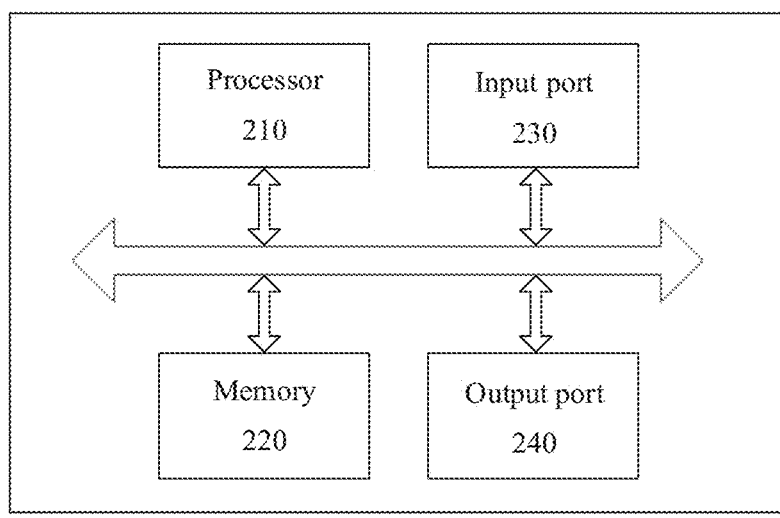
FIG. 11 is a schematic structural diagram of a channel correction apparatus applicable to an embodiment of this application.

FIG. 11 is a schematic structural diagram of a channel correction apparatus applicable to an embodiment of this application. The apparatus may be configured to implement the function of the first RRU in the foregoing channel correction method. For example, the apparatus may be the foregoing first RRU, or the apparatus may be a chip, in the first RRU, that can implement the foregoing channel correction method, or another device that can implement the function of the first RRU in the foregoing channel correction method. Specifically, the apparatus may include a processor 210 (namely, an example of the processing unit 130 in FIG. 10) and a memory 220. The memory 220 is configured to store instructions.

The processor 210 is configured to execute the instructions stored in the memory 220, so that the apparatus implements the step performed by the first RRU in the foregoing method.

Further, the apparatus may further include an input port 230 and an output port 240 (namely, examples of the receiving unit 120 and the sending unit 110 in FIG. 10). Further, the processor 210, the memory 220, the input port 230, and the output port 240 may communicate with each other by using an internal connection path, to transmit control and/or data information. The memory 220 is configured to store a computer program. The processor 210 may be configured to: invoke the computer program from the memory 220, and run the computer program, to control the input port 230 to receive information and control the output port 240 to send information, to implement the step performed by the first RRU in the foregoing method. The memory 220 may be integrated into the processor 210, or the memory 220 and the processor 210 may be separately disposed.

Optionally, the input port 230 is a receiver, and the output port 240 is a transmitter. The receiver and the transmitter may be a same physical entity or different physical entities. When the receiver and the transmitter are a same physical entity, the receiver and the transmitter may be collectively referred to as a transceiver.

Figure 12:
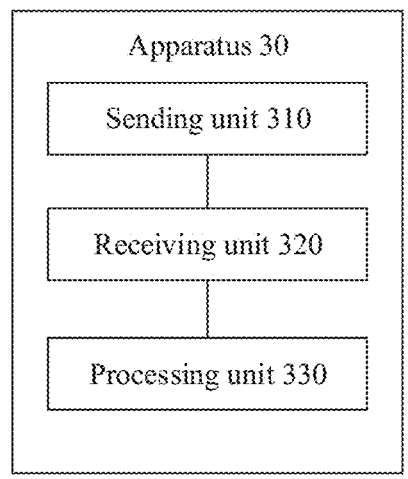
FIG. 12 is a schematic diagram of a second RRU according to an embodiment of this application.

FIG. 12 is a schematic diagram of a second RRU 30 according to an embodiment of this application. As shown in FIG. 12, the second RRU 30 includes a sending unit 310, a receiving unit 320, and a processing unit 330.

The sending unit 310 is configured to send a third correction reference signal to a first antenna and a second antenna through a third antenna by using a second transmit power and a second weight vector.

The sending unit 310 is further configured to send a fourth correction reference signal to the first antenna and the second antenna through a fourth antenna by using the second transmit power and the second weight vector. The second transmit power is a transmit power in a preset second transmit power set, and the second weight vector is a weight vector in a preset second weight vector set.

The receiving unit 320 is configured to receive, through the third antenna and the fourth antenna, a first correction reference signal sent by a first RRU through the first antenna by using a first transmit power and a first weight vector.

The receiving unit 320 is further configured to receive, through the third antenna and the fourth antenna, a second correction reference signal sent by the first RRU through the second antenna by using the first transmit power and the first weight vector. The first transmit power is a transmit power in a preset first transmit power set, and the first weight vector is a weight vector in a preset first weight vector set.

The processing unit 330 is configured to: combine correction reference signals respectively received by the third antenna and the fourth antenna into a fifth correction reference signal, and combine a correction reference signal received by the first antenna and a correction reference signal received by the second antenna into a sixth correction reference signal. The fifth correction reference signal and the sixth correction reference signal are used to calculate a correction coefficient of transmit/receive channels between the first RRU and the second RRU.

The second RRU 30 exactly corresponds to the second RRU in the method embodiments, and a corresponding unit of the second RRU 30 is configured to perform the corresponding step performed by the second RRU in the method embodiments shown in FIG. 5 to FIG. 9.

The sending unit 310 in the second RRU 30 performs the step of sending by the second RRU in the method embodiments, for example, performs step 130 of sending a third correction reference signal and a fourth correction reference signal to the first RRU in FIG. 5. The receiving unit 320 performs the step of receiving by the second RRU in the method embodiments, for example, performs step 110 of receiving a first correction reference signal and a second correction reference signal in FIG. 5. The processing unit 330 performs the step implemented or processed in the second RRU in the method embodiment, for example, performs step 120 of obtaining a fifth correction reference signal in FIG. 5.

Optionally, the receiving unit 320 and the sending unit 310 may form a transceiver unit, which has both a receiving function and a sending function. The processing unit 330 may be a processor. The sending unit 310 may be a receiver. The receiving unit 320 may be a transmitter. The receiver and the transmitter may be integrated into a transceiver.

Figure 13:
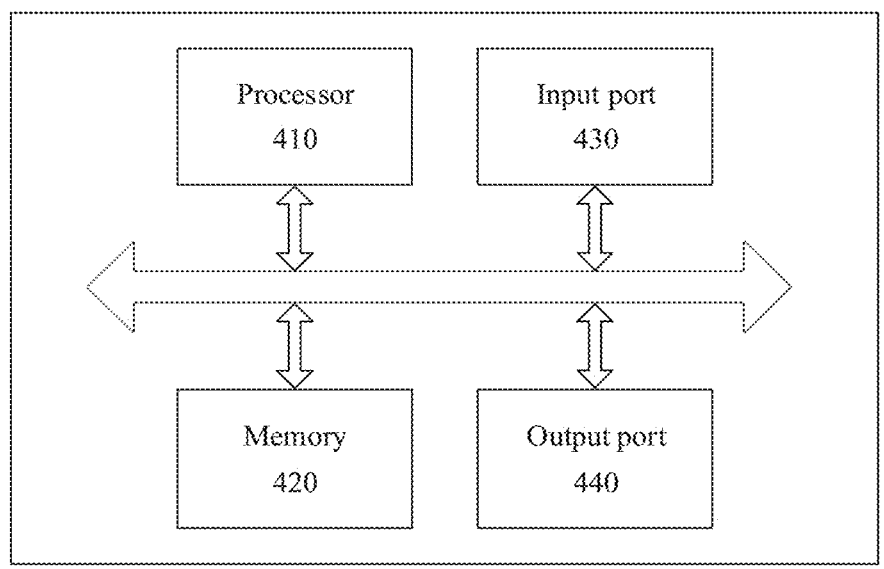
FIG. 13 is a schematic structural diagram of another channel correction apparatus applicable to an embodiment of this application.

FIG. 13 is a schematic structural diagram of another channel correction apparatus applicable to an embodiment of this application. The apparatus may be configured to implement the function of the second RRU in the foregoing channel correction method. For example, the apparatus may be the foregoing second RRU, or the apparatus may be a chip, in the second RRU, that can implement the foregoing channel correction method, or another device that can implement the function of the second RRU in the foregoing channel correction method. Specifically, the apparatus may include a processor 410 (namely, an example of the processing unit 330 in FIG. 12) and a memory 420. The memory 420 is configured to store instructions.

The processor 410 is configured to execute the instructions stored in the memory 420, so that the apparatus implements the step performed by the second RRU in the foregoing method.

Further, the apparatus may further include an input port 430 and an output port 440 (namely, examples of the receiving unit 320 and the sending unit 310 in FIG. 12). Further, the processor 410, the memory 420, the input port 430, and the output port 440 may communicate with each other by using an internal connection path, to transmit control and/or data information. The memory 420 is configured to store a computer program. The processor 410 may be configured to: invoke the computer program from the memory 420, and run the computer program, to control the input port 430 to receive information and control the output port 440 to send information, to implement the step performed by the second RRU in the foregoing method. The memory 420 may be integrated into the processor 410, or the memory 220 and the processor 410 may be separately disposed.

Optionally, the input port 430 is a receiver, and the output port 440 is a transmitter. The receiver and the transmitter may be a same physical entity or different physical entities. When the receiver and the transmitter are a same physical entity, the receiver and the transmitter may be collectively referred to as a transceiver.

An embodiment of this application further provides a system, and the system includes the foregoing one or more first RRUs and second RRUs.

This application further provides a computer-readable storage medium. The computer-readable storage medium stores instructions. When the instructions are run on a computer, the computer is enabled to perform the steps performed by the first RRU in the methods shown in FIG. 5 to FIG. 9.

This application further provides a computer-readable storage medium. The computer-readable storage medium stores instructions. When the instructions are run on a computer, the computer is enabled to perform the steps performed by the second RRU in the methods shown in FIG. 5 to FIG. 9.

This application further provides a computer program product that includes instructions. When the computer program product is run on a computer, the computer is enabled to perform the steps performed by the first RRU in the methods shown in FIG. 5 to FIG. 9.

This application further provides a computer program product that includes instructions. When the computer program product is run on a computer, the computer is enabled to perform the steps performed by the second RRU in the methods shown in FIG. 5 to FIG. 9.

This application further provides a chip, including a processor. The processor is configured to: read and run a computer program stored in a memory, to perform the corresponding operation and/or procedure performed by the first RRU in the channel correction method provided in this application. Optionally, the chip further includes the memory. The memory and the processor are connected by using a circuit or a wire. The processor is configured to: read and execute the computer program in the memory. Further, optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

This application further provides a chip, including a processor. The processor is configured to: invoke and run a computer program stored in a memory, to perform the corresponding operation and/or procedure performed by the second RRU in the channel correction method provided in this application. Optionally, the chip further includes the memory. The memory and the processor are connected by using a circuit or a wire. The processor is configured to: read and execute the computer program in the memory. Further, optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for correcting transmit and receive channels between a first remote radio unit (RRU) and a second RRU, wherein the first RRU comprises a first antenna and a second antenna, the second RRU comprises a third antenna and a fourth antenna, and wherein the method comprises:
   sending, by the first RRU, a first correction reference signal to the third antenna and the fourth antenna through the first antenna by using a first transmit power and a first weight vector;
   sending, by the first RRU, a second correction reference signal to the third antenna and the fourth antenna through the second antenna by using the first transmit power and the first weight vector;
   receiving, by the first RRU and through the first antenna and the second antenna, a third correction reference signal sent by the second RRU through the third antenna by using a second transmit power and a second weight vector;
   receiving, by the first RRU and through the first antenna and the second antenna, a fourth correction reference signal sent by the second RRU through the fourth antenna by using the second transmit power and the second weight vector, wherein
   the first transmit power is a transmit power in a preset first transmit power set, and the first weight vector is a weight vector in a preset first weight vector set; and the second transmit power is a transmit power in a preset second transmit power set, and the second weight vector is a weight vector in a preset second weight vector set;
   combining a correction reference signal received by the third antenna and a correction reference signal received by the fourth antenna into a fifth correction reference signal;
   combining a correction reference signal received by the first antenna and a correction reference signal received by the second antenna into a sixth correction reference signal, wherein the fifth correction reference signal and the sixth correction reference signal are used to calculate a correction coefficient of the transmit and receive channels between the first RRU and the second RRU.

2. The method according to claim 1, wherein the fifth correction reference signal is obtained by adding a correction reference signal obtained after the correction reference signal received by the third antenna is multiplied by a weight corresponding to the third antenna in the second weight vector and a correction reference signal obtained after the correction reference signal received by the fourth antenna is multiplied by a weight corresponding to the fourth antenna in the second weight vector.

3. The method according to claim 1, wherein the sixth correction reference signal is obtained by adding a correction reference signal obtained after the correction reference signal received by the first antenna is multiplied by a weight corresponding to the first antenna in the first weight vector and a correction reference signal obtained after the correction reference signal received by the second antenna is multiplied by a weight corresponding to the second antenna in the first weight vector.

4. The method according to claim 3, wherein the first correction reference signal is obtained after a preset correction reference signal is multiplied by the weight corresponding to the first antenna in the first weight vector, and the second correction reference signal is obtained after the preset correction reference signal is multiplied by the weight corresponding to the second antenna in the first weight vector.

5. The method according to claim 1, wherein an optional set comprises at least one optional subset, the optional subset comprises a transmit power and a weight vector for selection by the first RRU, and a transmit power and a weight vector for selection by the second RRU, and wherein a first optional subset in the at least one optional subset comprises the first transmit power, the first weight vector, the second transmit power, and the second weight vector.

6. The method according to claim 5, wherein the first optional subset corresponds to a first receive power, a second receive power, a third receive power, a fourth receive power, a signal-to-noise ratio of the fifth correction reference signal, and a signal-to-noise ratio of the sixth correction reference signal; the first receive power, the second receive power, the third receive power, and the fourth receive power meet a preset power threshold; the signal-to-noise ratio of the fifth correction reference signal and the signal-to-noise ratio of the sixth correction reference signal meet a preset signal-to-noise ratio threshold; and
   the first receive power is a power of the correction reference signal received by the first antenna, the second receive power is a power of the correction reference signal received by the second antenna, the third receive power is a power of the correction reference signal received by the third antenna, and the fourth receive power is a power of the correction reference signal received by the fourth antenna.

7. The method according to claim 6, wherein a signal-to-noise ratio with a smaller value in the signal-to-noise ratio of the fifth correction reference signal and the signal-to-noise ratio of the sixth correction reference signal is a signal-to-noise ratio with a largest value in a plurality of signal-to-noise ratios, and each of the plurality of signal-to-noise ratios is a signal-to-noise ratio with a smaller value in two signal-to-noise ratios corresponding to each of a plurality of optional subsets.

8. A channel correction device for correcting transmit and receive channels between a first remote radio unit (RRU) and a second RRU, wherein the first RRU comprises a first antenna and a second antenna, and the second RRU comprises a third antenna and a fourth antenna, and wherein the channel correction device comprises:
- a transceiver;
- a non-transitory memory storage comprising computer-executable instructions; and
- one or more processors, wherein the one or more processors execute the computer-executable instructions to cause the channel correction device to perform operations comprising:
  - sending a first correction reference signal to the third antenna and the fourth antenna through the first antenna by using a first transmit power and a first weight vector;
  - sending a second correction reference signal to the third antenna and the fourth antenna through the second antenna by using the first transmit power and the first weight vector;
  - receiving, through the first antenna and the second antenna, a third correction reference signal separately sent by the second RRU through the third antenna and the fourth antenna by using a second transmit power and a second weight vector;
  - receiving, through the first antenna and the second antenna, a fourth correction reference signal sent by the second RRU through the fourth antenna by using the second transmit power and the second weight vector, wherein
  - the first transmit power is a transmit power in a preset first transmit power set, the first weight vector is a weight vector in a preset first weight vector set, the second transmit power is a transmit power in a preset second transmit power set, and the second weight vector is a weight vector in a preset second weight vector set;
  - combining a correction reference signal received by the third antenna and a correction reference signal received by the fourth antenna into a fifth correction reference signal;
  - combining a correction reference signal received by the first antenna and a correction reference signal received by the second antenna into a sixth correction reference signal, wherein the fifth correction reference signal and the sixth correction reference signal are used to calculate a correction coefficient of the transmit and receive channels between the first RRU and the second RRU.

9. The channel correction device according to claim 8, wherein the fifth correction reference signal is obtained by adding a correction reference signal obtained after the correction reference signal received by the third antenna is multiplied by a weight corresponding to the third antenna in the second weight vector and a correction reference signal obtained after the correction reference signal received by the fourth antenna is multiplied by a weight corresponding to the fourth antenna in the second weight vector.

10. The channel correction device according to claim 8, wherein the sixth correction reference signal is obtained by adding a correction reference signal obtained after the correction reference signal received by the first antenna is multiplied by a weight corresponding to the first antenna in the first weight vector and a correction reference signal obtained after the correction reference signal received by the second antenna is multiplied by a weight corresponding to the second antenna in the first weight vector.

11. The channel correction device according to claim 10, wherein the first correction reference signal is obtained by multiplying a preset correction reference signal by the weight corresponding to the first antenna in the first weight vector; and
- the second correction reference signal is obtained by multiplying the preset correction reference signal by the weight corresponding to the second antenna in the first weight vector.

12. The channel correction device according to claim 8, wherein an optional set comprises at least one optional subset, the optional subset comprises a transmit power and a weight vector for selection by the first RRU, and a transmit power and a weight vector for selection by the second RRU, and wherein a first optional subset in the at least one optional subset comprises the first transmit power, the first weight vector, the second transmit power, and the second weight vector.

13. The channel correction device according to claim 12, wherein the first optional subset corresponds to a first receive power, a second receive power, a third receive power, a fourth receive power, a signal-to-noise ratio of the fifth correction reference signal, and a signal-to-noise ratio of the sixth correction reference signal; the first receive power, the second receive power, the third receive power, and the fourth receive power meet a preset power threshold; the signal-to-noise ratio of the fifth correction reference signal and the signal-to-noise ratio of the sixth correction reference signal meet a preset signal-to-noise ratio threshold; and
- the first receive power is a power of the correction reference signal received by the first antenna, the second receive power is a power of the correction reference signal received by the second antenna, the third receive power is a power of the correction reference signal received by the third antenna, and the fourth receive power is a power of the correction reference signal received by the fourth antenna.

14. The channel correction device according to claim 13, wherein a signal-to-noise ratio with a smaller value in the signal-to-noise ratio of the fifth correction reference signal and the signal-to-noise ratio of the sixth correction reference signal is a signal-to-noise ratio with a largest value in a plurality of signal-to-noise ratios, and each of the plurality of signal-to-noise ratios is a signal-to-noise ratio with a smaller value in two signal-to-noise ratios corresponding to each of the at least one optional subset.

* * * * *